US008296045B2

(12) United States Patent
Qi et al.

(10) Patent No.: US 8,296,045 B2
(45) Date of Patent: Oct. 23, 2012

(54) TRAFFIC INFORMATION PROCESSING APPARATUS AND METHOD, TRAFFIC INFORMATION INTEGRATING DEVICE AND METHOD

(75) Inventors: Hongwei Qi, Beijing (CN); Qiangze Feng, Beijing (CN); Yuguang Liu, Beijing (CN); Toshikazu Fukushima, Beijing (CN); Bangyong Liang, Beijing (CN); Xin Meng, Beijing (CN)

(73) Assignee: NEC (China) Co., Ltd., Beijing (CN)

(*) Notice: Subject to any disclaimer, the term of this patent is extended or adjusted under 35 U.S.C. 154(b) by 1154 days.

(21) Appl. No.: 12/146,991

(22) Filed: Jun. 26, 2008

(65) Prior Publication Data

US 2009/0037087 A1 Feb. 5, 2009

(30) Foreign Application Priority Data

Jun. 28, 2007 (CN) .......................... 2007 1 0127120

(51) Int. Cl.
*G06F 19/00* (2011.01)
*G06G 7/70* (2006.01)
*G06G 7/76* (2006.01)
*G06G 1/00* (2006.01)

(52) U.S. Cl. ................... 701/117; 701/118; 340/995.12; 340/995.13

(58) Field of Classification Search .................. 701/117, 701/118; 340/905, 907, 995.12, 995.13
See application file for complete search history.

(56) References Cited

U.S. PATENT DOCUMENTS 5,164,904 A 11/1992 Sumner
5,173,691 A 12/1992 Sumner
5,523,950 A * 6/1996 Peterson .................... 455/456.5
5,933,100 A * 8/1999 Golding ................... 340/995.13
6,278,965 B1 * 8/2001 Glass et al. ...................... 703/22
6,356,836 B1 * 3/2002 Adolph .......................... 701/208
6,944,642 B1 * 9/2005 Hopmann et al. ............ 709/203
6,965,574 B1 * 11/2005 Cook et al. .................... 370/252
7,266,443 B2 * 9/2007 Hirose .......................... 701/117
7,512,489 B2 * 3/2009 Endo et al. .................... 701/209
2004/0225433 A1 * 11/2004 Burt .............................. 701/200
2007/0094384 A1 4/2007 Matsumura et al.
2007/0118275 A1 5/2007 Qi et al.
2007/0118564 A1 * 5/2007 Qi et al. ..................... 707/104.1

FOREIGN PATENT DOCUMENTS

CN 1967524 A 5/2007
JP 2002-260162 A 9/2002
JP 2006-23886 A 1/2006
JP 2007-73024 A 3/2007
JP 2007-141243 A 6/2007

* cited by examiner

*Primary Examiner* — Khoi Tran
*Assistant Examiner* — Jamie Figueroa
(74) *Attorney, Agent, or Firm* — Sughrue Mion, PLLC

(57) ABSTRACT

The present invention provides a traffic information processing apparatus and method, the apparatus comprises a format unifying device which unifies input traffic information with different formats to traffic information with unified format; and a traffic information integrating device which corrects and/or complements the traffic information with unified format based on a knowledge base to obtain traffic information which is consistent with each other, so as to integrate the traffic information, wherein the knowledge base is external to the apparatus or internal to the apparatus. The traffic information processing apparatus and method according to the present invention can process traffic information with spatial inconsistence, temporal inconsistence and semantic inconsistence so as to integrate effectively the traffic information from a variety of heterogeneous information sources and ensure the accuracy, completeness and reliability of traffic data.

27 Claims, 19 Drawing Sheets

Fig. 2 defontology Knowledge Base

{

// concept section concept: concept table

// attribute section attribute: longitude

: type numerical attribute: altitude

: type numerical

...

// relation section relation :relation table

// axiom section axiom : isa(x , y) & isa(y , z) → isa(x, z)

axiom : cross(x, $y_1$ , ..., $y_i$ , ...) → between($y_i$, $y_{i-1}$ , $y_{i+1}$)

...

}

Fig. 4a

| Name | Type | Synonym |
|---|---|---|
| Road | Geographic category | Route |
| Bridge | Geographic category | |
| Point of Interest | Geographic category | |
| Fourth North Ring Road | Geographic entity | Fourth North Ring Route |
| Xueyuan Bridge | Geographic entity | |
| Beihang West Gate | Geographic entity | West Gate of Beijing University of Aeronautics and Astronautics |
| From east to west | Geographic direction | east to west, from east toward west |
| From south to north | Geographic direction | south to north, from south toward north |
| Congested | Traffic status | Traffic jam, Car blockage |
| Traffic accident | Traffic status | Car accident, accident |
| ... | ... | |

Fig. 4b

| Relation name | Relation type | Relation value type | Relation value set | Note |
|---|---|---|---|---|
| cross | Spatial | (Geographic entity, Geographic entity, Geographic entity,...) | • Cross(Fourth North Ring Road, Baofushi Bridge, Xueyuan Bridge, Jianxiang Bridge,...)<br>• ... | Sequential |
| between | Spatial | (Geographic entity, Geographic entity, Geographic entity) | • Between(Xuezhi Bridge, Xueyuan Bridge, Jimen Bridge)<br>• Between(Xueyuan Bridge, Baofushi Bridge, Jianxiang Bridge)<br>• ... | Adjoining |
| isa | Semantic | (Geographic entity, Geographic category) | • isa(Fourth North Ring Road, Road)<br>• ... | Subordinate |
| causal | Semantic | (Traffic status, Traffic status) | • Causal(congested, traffic accident)<br>• ... | Causal |
| a ntonym | Semantic | (Traffic status, Traffic status) | • Antonym(congested, unblocked)<br>• ... | Antonymous |
| ... | ... | | | |

Unified format

| Information source | Location | Direction | Traffic status | Time |
|---|---|---|---|---|
| Camera | Xueyan Bridge | From west to east | Congested | 07-3-15 17:50 |
| User report | Sitong Bridge | From south to north | Congested | 07-3- 15 18:15 |

Fig. 10

| Information source | Location | Direction | Traffic status | Time |
|---|---|---|---|---|
| Traffic floating car | Fourth North Ring Road | From west to east | Congested | 07-3- 15 08:45 |
| User report | Beihang West Gate | From north to south | Unblocked | 07-3- 15 09:12 |

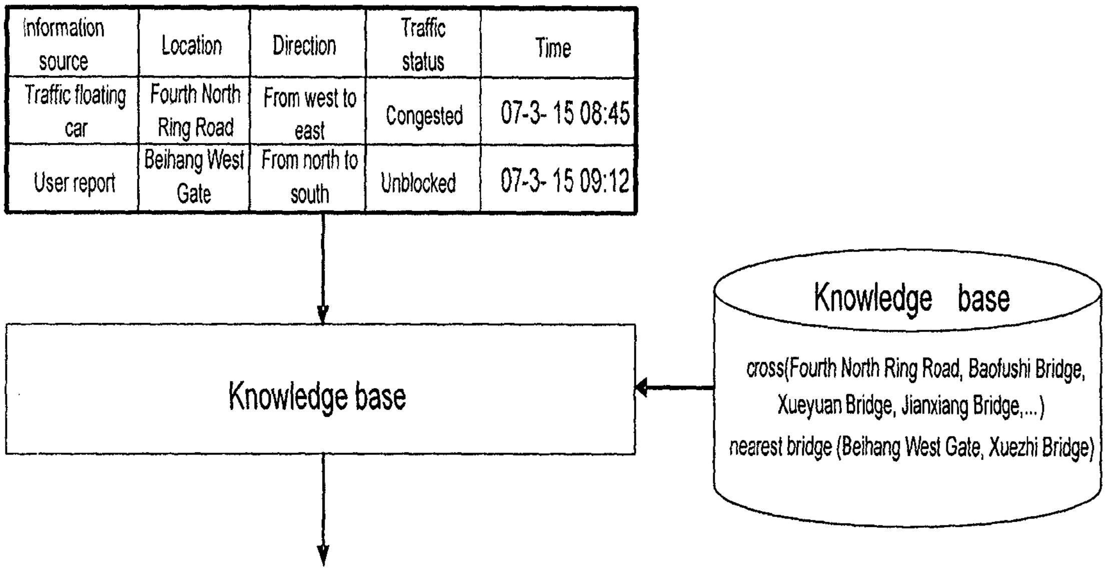

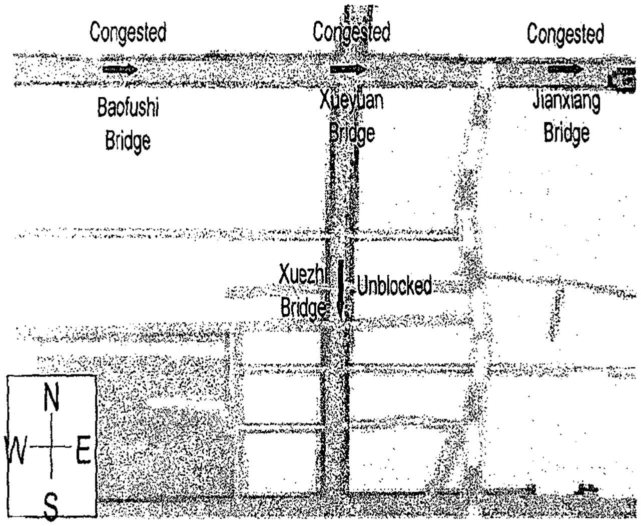

| Information source | Location | Direction | Traffic status | Time |
|---|---|---|---|---|
| Traffic floating car | Baofushi Bridge | From west to east | Congested | 07-3- 15 08:45 |
| Traffic floating car | Xueyuan Bridge | From west to east | Congested | 07-3- 15 08:45 |
| Traffic floating car | Jianxiang Bridge | From west to east | Congested | 07-3- 15 08:45 |
| Traffic floating car | ... | From west to east | Congested | 07-3- 15 08:45 |
| User report | Xuezhi Bridge | From north to south | unblocked | 07-3- 15 09:12 |

Fig. 13a

| | | | | |
|---|---|---|---|---|
| Traffic floating car | Baofushi Bridge | From west to east | Congested | 07-3- 15 17:58 |
| User report | Xueyuan Bridge | From west to east | Unblocked | 07-3- 15 17:58 |
| camera | Jianxiang Bridge | From west to east | Congested | 07-3- 15 17:58 |
| Navigating system | Xuezhi Bridge | From north to south | Congested | 07-3- 15 17:58 |

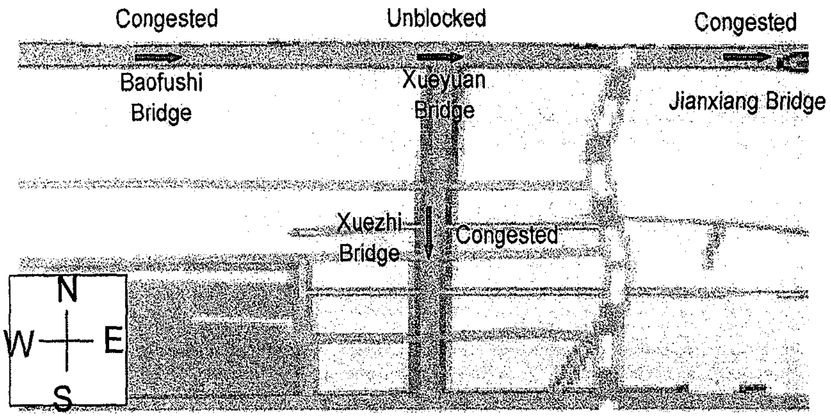

Spatial conflict processing

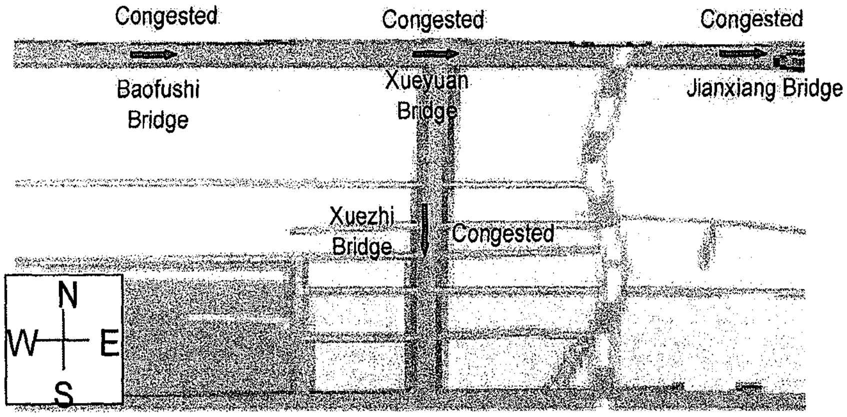

| | | | | |
|---|---|---|---|---|
| **Traffic floating car** | Baofushi Bridge | From west to east | Congested | 07-3- 15 17:58 |
| Integrating result | Xueyuan Bridge | From west to east | Congested | 07-3- 15 17:58 |
| camera | Jianxiang Bridge | From west to east | Congested | 07-3- 15 17:58 |
| Navigating system | Xuezhi Bridge | From north to south | Congested | 07-3- 15 17:58 |

Fig. 13b

| | | | | |
|---|---|---|---|---|
| Traffic floating car | Xueyuan Bridge | From north to south | Congested | 07-3- 15 17:58 |
| Navigating system | Jimen Bridge | From north to south | Congested | 07-3- 15 17:58 |

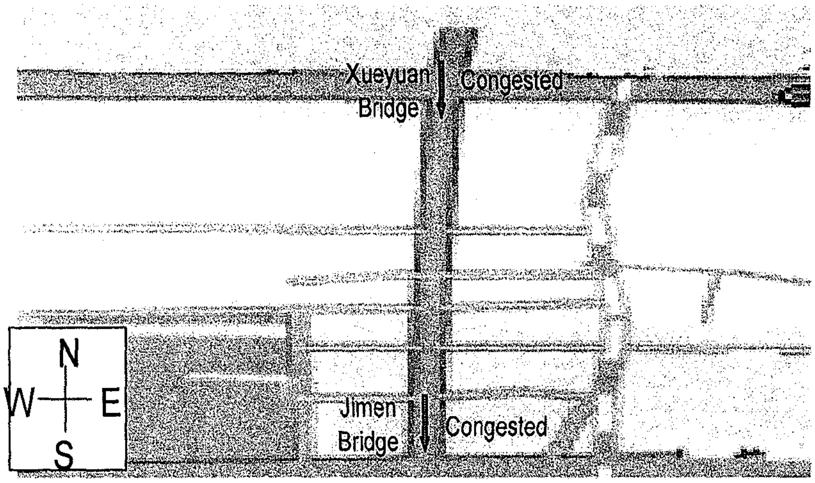

Spatial complementary processing

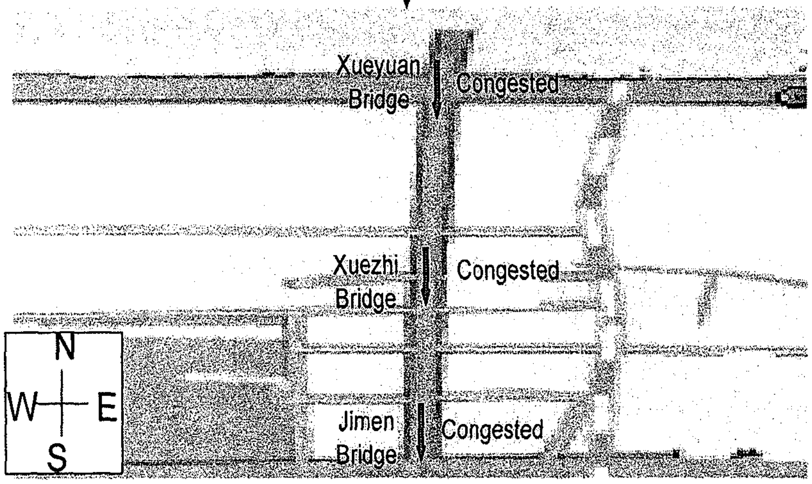

| | | | | |
|---|---|---|---|---|
| Traffic floating car | Xueyuan Bridge | From north to south | Congested | 07-3- 15 17:58 |
| Navigating system | Jimen Bridge | From north to south | Congested | 07-3- 15 17:58 |
| Integrating result | Xuezhi Bridge | From north to south | Congested | 07-3- 15 17:58 |

Fig. 14a

| Information source | Location | Direction | Traffic status | Time |
|---|---|---|---|---|
| Traffic floating car | Xuezhi Bridge | From west to east | Congested | 07-3-15 17:58 |
| User report | Xuezhi Bridge | From west to east | Unblocked | 07-3-15 17:59 |
| Camera | Xuezhi Bridge | From west to east | Congested | 07-3-15 18:00 |
| Navigating system | Xuezhi Bridge | From west to east | Congested | 07-3-15 18:01 |

↓

Time conflict processing

↓

| Information source | Location | Direction | Traffic status | Time |
|---|---|---|---|---|
| Traffic floating car | Xuezhi Bridge | From west to east | Congested | 07-3-15 17:58 |
| Integrating result | Xuezhi Bridge | From west to east | Congested | 07-3-15 17:59 |
| Camera | Xuezhi Bridge | From west to east | Congested | 07-3-15 18:00 |
| Navigating system | Xuezhi Bridge | From west to east | Congested | 07-3-15 18:01 |

Traffic data graph of Xuezhi Bridge

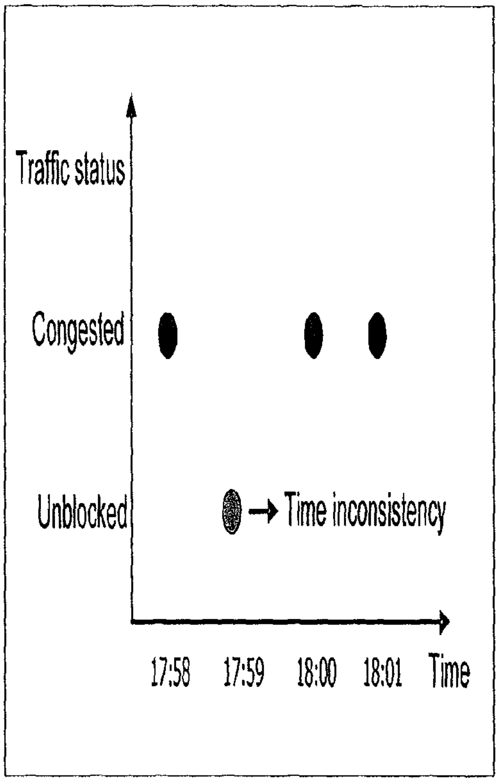

Fig. 14b

Traffic information to be processed

| Information source | Location | Direction | Traffic status | Time |
|---|---|---|---|---|
| Traffic floating car | Xueyuan Bridge | From west to east | Congested | 07-3-15 8:20 |
| User report | Xueyuan Bridge | From west to east | Congested | 07-3-15 8:21 |
| Navigating system | Xueyuan Bridge | From west to east | Congested | 07-3-15 8:23 |

Time complementary processing

Integrating result

| Information source | Location | Direction | Traffic status | Time |
|---|---|---|---|---|
| Traffic floating car | Xueyuan Bridge | From west to east | Congested | 07-3-15 8:20 |
| User report | Xueyuan Bridge | From west to east | Congested | 07-3-15 8:21 |
| Integrating result | Xueyuan Bridge | From west to east | Congested | 07-3-15 8:22 |
| Navigating system | Xueyuan Bridge | From west to east | Congested | 07-3-15 8:23 |

Traffic data graph of Xueyuan Bridge

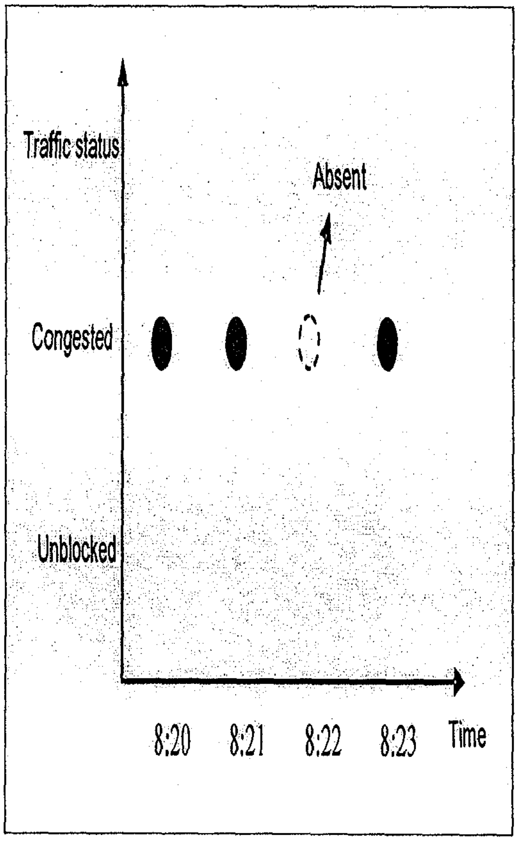

Fig. 15

| Information source | Location | Direction | Traffic status | Time |
|---|---|---|---|---|
| Traffic floating car | Xuezhi Bridge | From west to east | Congested | 07-3- 15 17:58 |
| Unblocked | Xuezhi Bridge | From west to east | Traffic accident | 07-3- 15 17:58 |
| User report | Xuezhi Bridge | From west to east | Unblocked | 07-3- 15 17:58 |

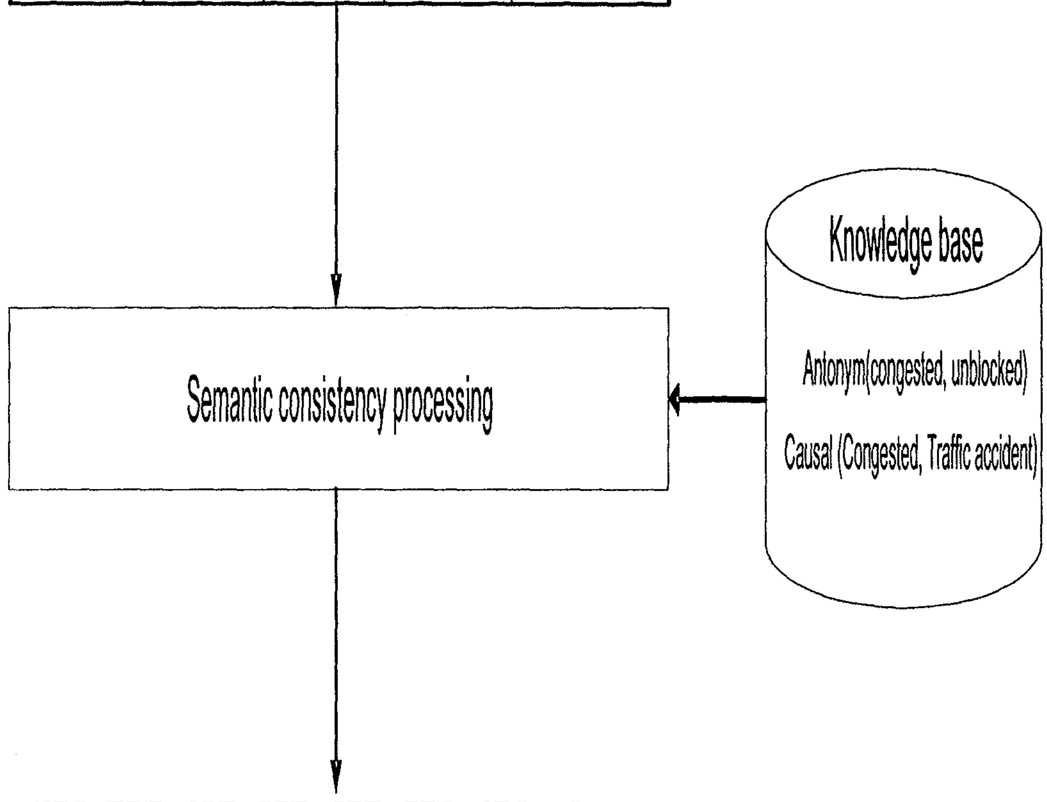

| Information source | Location | Direction | Traffic status | Time |
|---|---|---|---|---|
| Integrating result | Xuezhi Bridge | From west to east | Congested resulting from traffic accident | 07-3- 15 17:58 |

TRAFFIC INFORMATION PROCESSING APPARATUS AND METHOD, TRAFFIC INFORMATION INTEGRATING DEVICE AND METHOD

BACKGROUND OF THE INVENTION

1. Field of Invention

The present invention relates to the technical field of traffic information processing, and in particular to a traffic information processing apparatus and method as well as a traffic information integrating device and method.

2. Description of Prior Art

Nowadays, traffic congestion has increasingly become one of the major issues in modern cities due to the rapid advance of current auto industry and people's reliance on such vehicles. So far, efforts have been made in finding an effective solution for traffic jams. The existing techniques attempt to alleviate traffic congestions by providing traffic information service, in which the traffic information can be gathered from a plurality of heterogeneous information sources, such as traffic floating car, sensor/camera, navigating system, user report and the like. Although a great deal of traffic information can be gathered from multiple heterogeneous information sources, it is difficult to make full use of the traffic information since the information originates from various sources, and thus there are usually many kinds of differences among the gathered information, such as format variation, synonymous problem, spatial inconsistence, temporal inconsistence and semantic inconsistence. Therefore, how to efficiently integrate such heterogeneous traffic information has come to be an important and imperative issue.

Some systems and methods have been proposed for integrating traffic information from different information sources.

JP2006023886 reveals a traffic information system which acquires traffic information from multiple information sources as well as decimates and merges the acquired traffic information according to different route sections.

U.S. Pat. No. 5,173,691 discloses a method for fusing traffic congestion information, which can process raw traffic information from various sources and transform the raw information into traffic descriptions for respective route sections. If multiple traffic descriptions exist with respect to the same route section, selection of traffic information is conducted in accordance with the reliability of respective information sources.

JP2002260162 provides a traffic information provision system which can provide comprehensive global traffic information based on local traffic information transmitted from multiple mobile phone terminals. If several traffic descriptions exist with respect to the same district, selection of traffic information is conducted in accordance with the reliability of respective information sources.

In summary, the known traffic information processing methods or provision systems can perform simple combination of several heterogeneous traffic information as well as process traffic information having different formats or being synonymous with each other. Unfortunately, for the gathered traffic information, these known methods and systems cannot process the part that has inconsistence in terms of space, time or semantics, and thus cannot provide users with accurate, complete and reliable traffic information.

SUMMARY OF THE INVENTION

The present invention is made to solve the above problems. The present invention provides a traffic information processing apparatus and method, by which traffic information having different formats, the same meaning or inconsistence in space, time or semantics can be processed so as to integrate effectively the traffic information from a variety of heterogeneous information sources and ensure the accuracy, completeness and reliability of traffic data.

According to the first aspect of the present invention, a traffic information processing apparatus is provided comprising:

a format unifying device which unifies input traffic information with different formats to traffic information with unified format; and a traffic information integrating device which corrects and/or complements the traffic information with unified format based on a knowledge base to obtain traffic information which is consistent with each other, so as to integrate the traffic information, wherein the knowledge base is external to the apparatus or internal to the apparatus.

According to the second aspect of the present invention, the traffic information integrating device comprises:

an input unit which receives the traffic information with unified format;

a spatial conflict processing unit which detects the traffic information of which described spatial locations are adjoined but the traffic description are contradict with each other according to a relation section of the knowledge base, and corrects the contradict traffic information so as to integrate the traffic information; and an output unit which outputs the integrated traffic information.

According to the third aspect of the present invention, the traffic information integrating device comprises:

an input unit which receives the traffic information with unified format;

a spatial complementary processing unit which detects the traffic information of which described spatial location are adjoined but the traffic description are not complete according to a relation section of the knowledge base, and then generates complementary traffic information so as to form the integrated traffic information;

an output unit which outputs the integrated traffic information.

According to the fourth aspect of the present invention, the traffic information integrating device comprises:

an input unit which receives the traffic information with unified format;

a time conflict processing unit which corrects the traffic information that has time conflict with each other by comparing the traffic status about the same location on different time according to the concept section in the knowledge base, so as to integrate the traffic information; and an output unit which outputs the integrated traffic information.

According to the fifth aspect of the present invention, the traffic information integrating device comprises:

an input unit which receives the traffic information with unified format;

a time complementary processing unit which adds new traffic information or complements the traffic information that lacks traffic status by comparing the traffic information on adjacent time, so as to integrate the traffic information; and an output unit which outputs the integrated traffic information.

According to the sixth aspect of the present invention, the traffic information integrating device comprises:

an input unit which receives the traffic information with unified format;

a semantic conflict processing unit which searches the traffic information that has semantic conflict with each other based on the relation section in the knowledge base, and selects the traffic information having high reliability from the traffic information that has semantic conflict with each other, according to at least one of the determination conditions including the reliability of an information source, the majority having priority, comparison with the current time and comparison with history traffic data, so as to integrate the traffic information; and an output unit which outputs the integrated traffic information.

According to the seventh aspect of the present invention, the traffic information integrating device comprises:

an input unit which receives the traffic information with unified format;

a semantic complementary processing unit which searches the traffic information that semantically complements with each other according to the relation section in the knowledge base, and combines the traffic information that semantically complements with each other, so as to integrate the traffic information; and an output unit which outputs the integrated traffic information.

According to the eighth aspect of the present invention, a traffic information processing method is provided comprising:

a format unifying step of unifying input traffic information with different formats to traffic information with unified format; and a traffic information integrating step of correcting and/or complementing the traffic information with unified format based on a knowledge base to obtain traffic information which is consistent with each other, so as to integrate the traffic information.

According to the ninth aspect of the present invention, the traffic information integrating steps comprises at least one of the following steps:

a spatial conflict processing step of detecting the traffic information of which described spatial location are adjoined but the traffic description are contradict with each other according to a relation section of the knowledge base, and correcting the contradict traffic information so as to integrate the traffic information;

a spatial complementary processing step of detecting the traffic information of which described spatial location are adjoined but the traffic description are not complete according to a relation section of the knowledge base, and then generating complementary traffic information so as to form the integrated traffic information;

a time conflict processing step of correcting the traffic information that has time conflict with each other by comparing the traffic status about the same location on different time according to the concept section in the knowledge base, so as to integrate the traffic information; and;

a time complementary processing step of adding new traffic information or complementing the traffic information that lacks traffic status by comparing the traffic information on adjacent time, so as to integrate the traffic information;

a semantic conflict processing step of searching the traffic information that has semantic conflict with each other based on the relation section in the knowledge base, and selecting the traffic information having high reliability from the traffic information that has semantic conflict with each other, according to at least one of the determination conditions including the reliability of an information source, the majority having priority, comparison with the current time and comparison with history traffic data, so as to integrate the traffic information;

a semantic complementary processing step of searching the traffic information that semantically complements with each other according to the relation section in the knowledge base, combining the traffic information that semantically complements with each other, so as to integrate the traffic information.

According to the tenth aspect of the present invention, a traffic information processing apparatus is provided comprising:

an input device, which receives traffic information with unified format;

a traffic information integrating device which corrects and/or complements the traffic information with unified format based on knowledge base to obtain traffic information which is consistent with each other, so as to integrate the traffic information, wherein the knowledge base is external to the apparatus or internal to the apparatus; and an output device which outputs the integrated traffic information.

According to the eleventh aspect of the present invention, a traffic information processing method is provided comprising:

an input step of receiving traffic information with unified format; and a traffic information integrating step of correcting and/or complementing the traffic information with unified format based on knowledge base to obtain traffic information which is consistent with each other, so as to integrate the traffic information; and an output step of outputting the integrated traffic information.

According to the twelfth aspect of the present invention, a traffic information processing method is provided, comprising at least one of the following steps:

a spatial conflict processing step of detecting the traffic information of which described spatial location are adjoined but the traffic description are contradict with each other according to a relation section of the knowledge base, and correcting the contradict traffic information so as to integrate the traffic information;

a spatial complementary processing step of detecting the traffic information of which described spatial location are adjoined but the traffic description are not complete according to a relation section of the knowledge base, and then generating complementary traffic information so as to form the integrated traffic information;

a time conflict processing step of correcting the traffic information that has time conflict with each other by comparing the traffic status about the same location on different time according to the concept section in the knowledge base, so as to integrate the traffic information; and;

a time complementary processing step of adding new traffic information or complementing the traffic information that lacks traffic status by comparing the traffic information on adjacent time, so as to integrate the traffic information;

a semantic conflict processing step of searching the traffic information that has semantic conflict with each other based on the relation section in the knowledge base, and selecting the traffic information having high reliability from the traffic information that has semantic conflict with each other, according to at least one determination condition from the determination conditions including the reliability of an information source, the majority having priority, comparison with the current time and comparison with history traffic data, so as to integrate the traffic information; and a semantic complementary processing step of searching the traffic information that semantically complements with each other according to the relation section in the knowledge base, and combining the traffic information that semantically complements with each other, so as to integrate the traffic information.

BRIEF DESCRIPTION OF THE DRAWINGS

FIG. 2 shows a schematic diagram of a knowledge base according to the present invention;

FIG. 4(*a*) shows an exemplary concept table of the knowledge base according to the present invention;

FIG. 4(*b*) shows an exemplary relation table of the knowledge base according to the present invention;

FIG. 10 is an example of knowledge base mapping according to the present invention;

FIG. 13(*a*) shows an example of traffic information spatial conflict processing according to the present invention;

FIG. 13(*b*) shows an example of traffic information spatial complement processing according to the present invention;

FIG. 14(*a*) shows an example of traffic information time conflict processing according to the present invention;

FIG. 14(*b*) shows an example of traffic information time complement processing according to the present invention;

FIG. 15 shows a schematic diagram of traffic information semantic consistency processing according to the present invention.

DETAILED DESCRIPTION OF PREFERRED EMBODIMENTS

Now, a description will be give to the preferred embodiments of the present invention with reference to the figures, throughout which the same elements are denoted by the same reference symbols or numbers. Besides, in the following description, detailed explanation of known functions and configurations will not be repeated, otherwise it may obscure the subject of the present invention.

Figure 1:
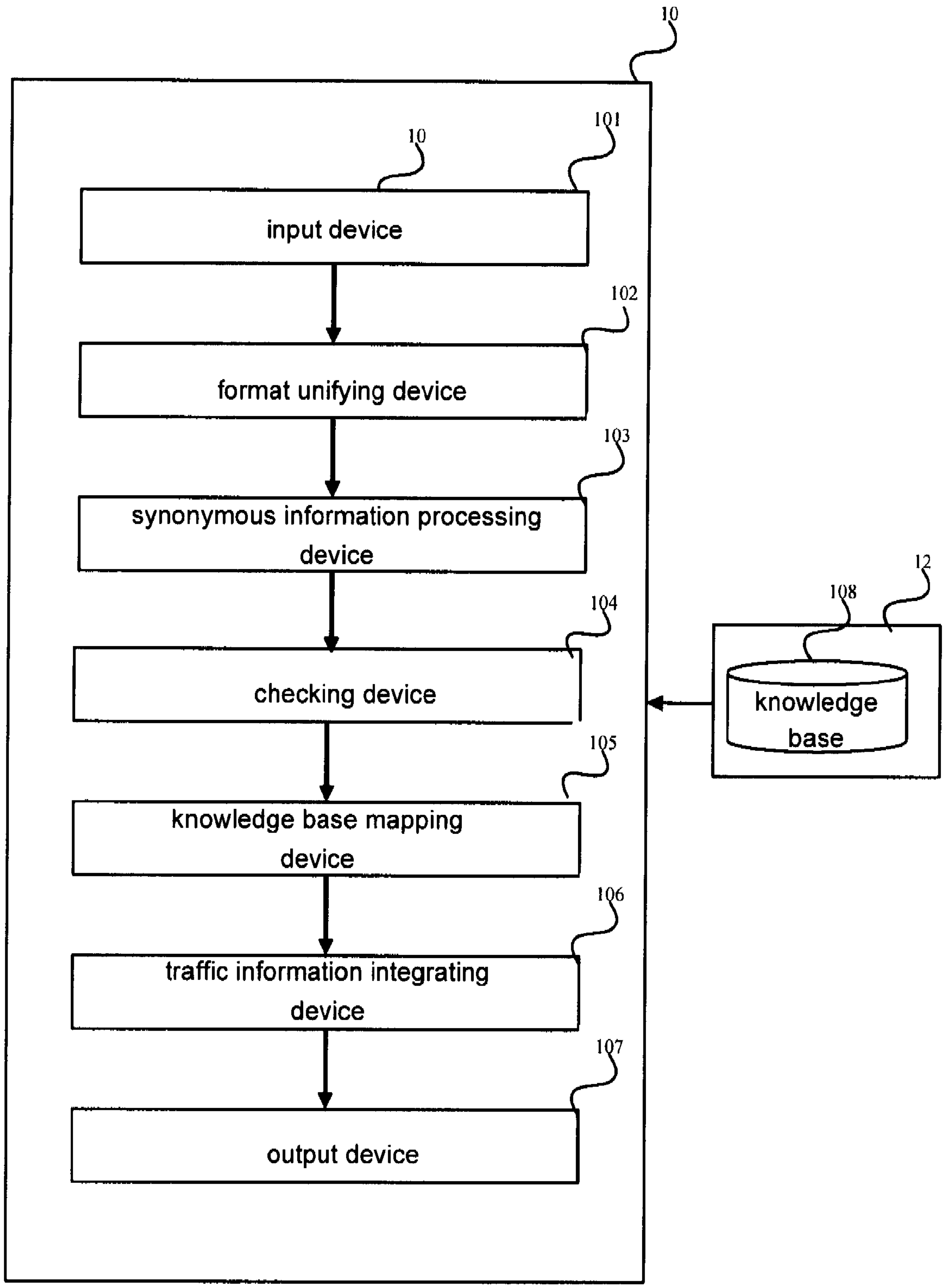
FIG. 1 shows a schematic diagram of a traffic information processing apparatus according to the present invention.

FIG. 1 shows a traffic information processing apparatus according to the present invention comprising an integrating part 10 and a knowledge base 108. The integrating part 10 includes an input device 101, a format unifying device 102, a synonymous information processing device 103, a checking device 104, a knowledge base mapping device 105, a traffic information integrating device 106 and an output device 107. The input device 101 is adapted to receive traffic information from a plurality of external heterogeneous information sources (not shown), such as traffic floating car, sensor/camera, navigating system or user report. The traffic information received from these external heterogeneous information sources often has different formats. The format unifying device 102 is adapted to unify the information description formats of the input traffic information for the subsequent processing. The synonymous information processing device 103 transforms the synonymous descriptions in the traffic information with unified format to identical description information. The checking device 104 checks the traffic information according to the knowledge base 108. The knowledge base mapping device 105 normalizes the traffic information and maps it to the knowledge base 108 according to the knowledge base 108, namely, maps the traffic information with unified format to the traffic information defined in the knowledge base by using the knowledge base, and transmits the mapped traffic information to the traffic information integrating device. The traffic information integrating device 106 is adapted to integrate the traffic information with spatial, temporal and semantic inconsistence according to the knowledge base 108. The output device 107 is adapted to output the integrated traffic information.

Particularly, the traffic information is received and transmitted by the input device 101 to the format unifying device 102, which unifies the formats of the traffic information and then transmits it to the synonymous information processing device 103. The synonymous information processing device 103 transforms the synonymous descriptions in the traffic information with unified format to identical description information and transmits the transformed traffic information to the checking device 104, which checks the received traffic information and transmits the checked traffic information to the knowledge base mapping device 105. The traffic information is received and mapped into the traffic information defined in the knowledge base 108 by the knowledge base mapping device 105 and transmitted to the traffic information integrating device 106. The traffic information integrating device 106 integrates the traffic information with spatial, temporal and semantic inconsistence according to the knowledge base 108. After that, the output device 107 is adapted to output the integrated traffic information.

It will be appreciated that the above illustrates only an exemplary traffic information processing apparatus. Alternatively, each of the format unifying device 102, the synonymous information processing device 103, the check device 104 and the knowledge base mapping device 105 can be optional device in the present invention.

The traffic information processing apparatus of the present invention analyzes and processes the received traffic information according to the knowledge base 108 so as to provide accurate and complete traffic information with spatial, temporal and semantic consistence. Thus, the knowledge base 108 according to the present invention will be first introduced with reference to FIGS. 2, 3, 4(*a*) and 4(*b*). Subsequently, the procedure of traffic information processing will be elaborated in connection to the knowledge base.

As shown in FIG. 2, the knowledge base generally includes four sections, namely, concept section, attribute section, relation section and axiom section.

(1) The concept section defines various concepts associated with traffic situations. The types of concepts include geographic categories, geographic entities, geographic direction and traffic status. The geographic entities usually have three types: point, line and plane, in which the point contains a bridge, an intersection and a point of interest (geographic object), such as the Xueyuan Bridge, the Hailong Building and the Beihang West Gate; the line consists of a road, such as the Zhichun Road and the Fourth North Ring Road; and the plane comprises a region, such as Tsinghua University and the Zhongguancun District. Each concept is represented as (name, type, synonymous), and the type and all the synonyms are specified for each concept. All concepts and their representations can be formed into a concept table. FIG. 4(*a*) shows an example of the concept table of the knowledge base, in which the phrase "road" is of geographic category, the phrase "the Fourth North Ring Road" belongs to geographic entities, the phrase "from east to west" has the type of geographic direction, and the type of the phrase "congested" is traffic status. The phrase "Beihang West gate" is of geographic entity type and has a synonym of West Gate of Beijing University of Aeronautics and Astronautics. It is obvious that a concept table can further contain other types, though the concept table in FIG. 4(*a*) includes only four types of geographic categories, geographic entities, geographic direction and types of traffic status.

(2) The attribute section defines the characteristics of a concept. For example, longitude and latitude are employed to depict the coordinates of a geographic entity in a map. Each attribute has at least one item "type" indicating the value type of the attribute. Any geographic entity can be precisely located with help of the attribute section.

(3) The relation section depicts various associations between concepts, that is, defines spatial relationship and semantic relationship between concepts. Each relation can be represented as (relation name, relation type, relation value type, relation value set, note), in which the relation name denotes the name of the relation, the relation type indicates whether the relation belongs to spatial relationship or a semantic relationship, the relation value type defines the value type of parameters of the relation, the relation value set represents all specific instances regarding the relation, and the note provides relevant explanation for the relation, i.e., explaining that certain relation represents a sequential relation, a subordinate relation or a causal relation. The spatial relationship comprises the sequential relation and location adjoining between geographic entities, and the semantic relationship contains such relations as subordinate, causal and antonymous relations. The relation type, relation value type and relation value set are specified for each relation, and the note can be specified. All relations and their representations can be combined into a relation table.

FIG. 4(*b*) shows an example of the relation table of the knowledge base. The word "cross" depicts the sequential relation between geographic entities, for example, "cross (the Fourth North Ring Road, the BaofuShi Bridge, the Xueyuan Bridge, the Jiangxiang Bridge, . . . ,)" denotes that the Fourth North Ring Road routes along the BaofuShi Bridge, the Xueyuan Bridge and the Jiangxiang Bridge sequentially. The word "between" describes the location adjoining relation between geographic entities, for example, "between (the Xuezhi Bridge, the Xueyuan Bridge, the Jimen Bridge)" indicates that the Xuezhi Bridge lies between the Xueyuan Bridge and the Jimen Bridge. The word "isa" denotes the subordinate relation between geographic entities and geographic categories, for example, "isa (the Fourth North Ring Road, Road)" implicates that the Fourth North Ring Road is a road. The word "causal" illustrates the causal relation between traffic statuses, for example, "causal(congested, traffic accident)" indicates that the traffic accident results in the congestion. The word "antonym" means the antonymous relation between traffic statues, for example, "antonym(congested, unblocked)" points out that congested and unblocked are opposite to each other. Since each attribute or relation defines certain aspect of a concept, a plurality of attributes and corresponding relations can be combined to describe an integral concept.

(4) The axiom section is rules which are based on the concept section and the relation section and can further deduce the spatial relationship between concepts. For the axiom "cross (x, $y_1, \ldots, y_i, \ldots$)→between ($y_i, y_{i-1}, y_{i+1}$)", if the Fourth North Ring Road routes along the BaofuShi Bridge, the Xueyuan Bridge and the Jiangxiang Bridge sequentially, it can be deduced that the Xueyuan Bridge is located between the BaofuShi Bridge and the Jiangxiang Bridge, that is, "cross (the Fourth North Ring Road, the BaofuShi Bridge, the Xueyuan Bridge, the Jiangxiang Bridge) →between (the Xueyuan Bridge, the BaofuShi Bridge, the Jiangxiang Bridge)". In general, the rules in the axiom section are limited in terms of number and can be expanded as demand. FIG. 2 shows only two exemplary axioms. The axiom section is generally organized and determined in a manual fashion.

Next, the method for generating the knowledge base 108 shown in FIG. 2 will be explained in detail with reference to FIG. 3. The knowledge base is formed by extracting a concept section, an attribute section and a relation section from an electronic map database, a history traffic database and a semantic dictionary.

Normally, all locations and corresponding geographic categories as well as their position data (e.g., longitude, latitude) are taken from the existing electronic map, and a set of GIS functions is utilized to conduct spatial calculation based on these data. The history traffic database stores all the traffic information received from respective heterogeneous information sources by the traffic information processing apparatus. Each piece of traffic information contains at least location, traffic and time, and it can also contain information source and direction. The semantic dictionary is a known one, such as Hownet.

Figure 3:
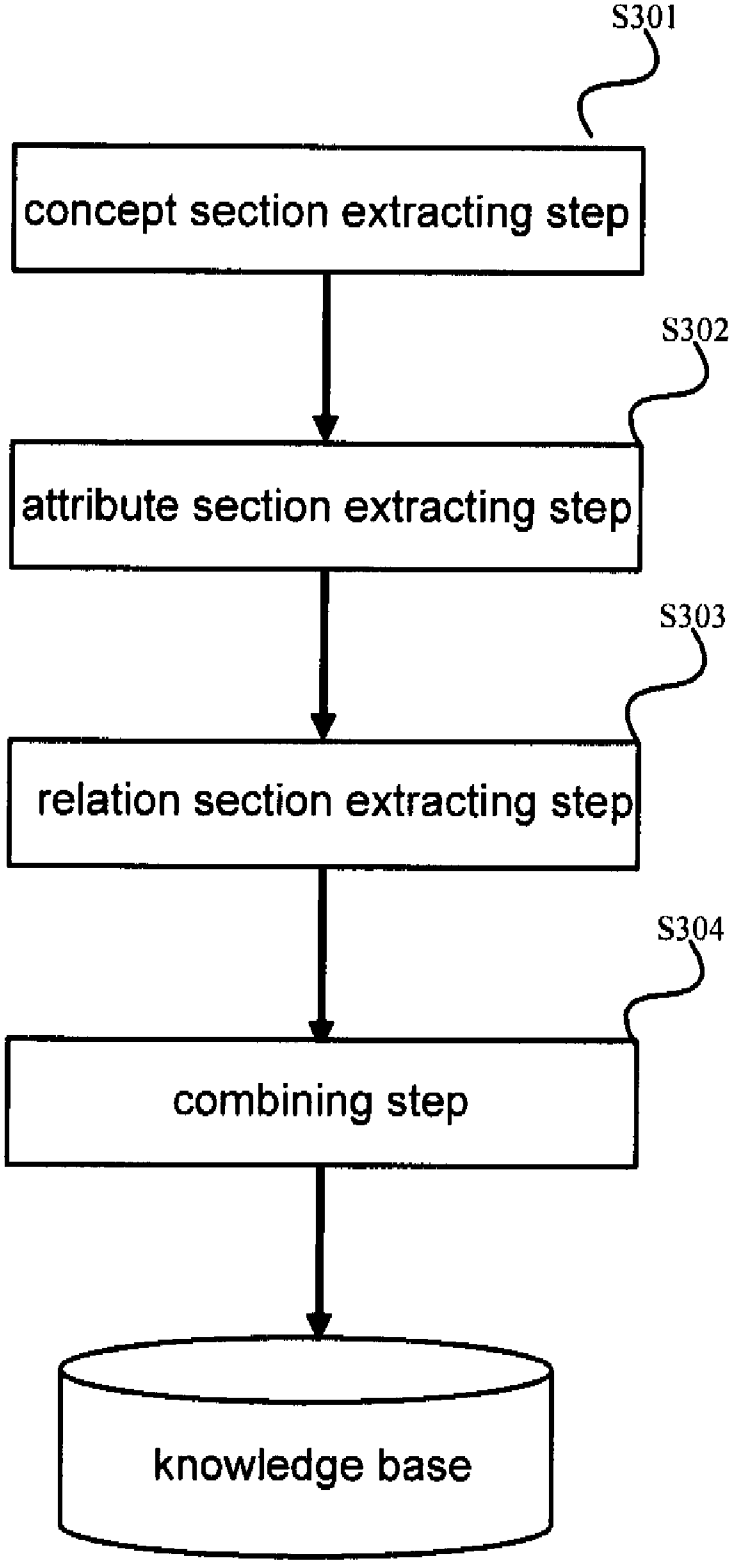
FIG. 3 shows a flowchart of a method for generating the knowledge base according to the present invention.

Now referring to FIG. 3, the concept section is extracted at S301. First, geographic categories are extracted by utilizing the existing GIS functions to extract all the geographic categories provided by the electronic map. Then, geographic entities are extracted by utilizing the existing GIS functions to extract all the locations marked on the electronic map. Next, geographic directions and traffic statuses are extracted by extracting the frequently-used geographic directions and traffic statuses in the traffic information directly from the history traffic database. After that, synonyms are extracted by utilizing all the synonyms of concepts found in the existing synonym library. Finally, a concept table is created according to the above extract result. FIG. 4(*a*) shows an example of the concept table.

The attribute section is extracted at S302. The data fields (e.g., longitude, latitude) associated with respective location description are first extracted from respective data tables in the electronic map database as an attribute. Subsequently, the value type corresponding to each attribute is obtained according to the type definition of each data field. The attribute and the value type serve together as the attribute section.

The relation section is extracted at S303. Geographic categories to which respective geographic entities belong are first extracted from the electronic map database so as to obtain the subordinate relation between the geographic entities and the geographic categories, with the subordinate relation belonging to the semantic relationship. Next, the spatial relationship between the geographic entities is calculated using the existing GIS functions. Then, other semantic relationship between respective concepts is acquired by utilizing known semantic dictionaries like Hownet. As an example, "antonym (congested, unblocked)" is extracted on the basis that the word "congested" and the word "unblocked" are opposite to each other. Eventually, a relation table is generated in accordance with the above extract result. FIG. 4(*b*) shows an example of the relation table.

At S304, the extracted concept section, attribute section, relation section and manually-defined axiom section are combined to form the ultimate knowledge base 108.

The knowledge base comprises the concept, attribute, relation and axiom sections, and the spatial and semantic relationships between concepts are defined in the relation section. Therefore, the traffic information processing apparatus according to the present invention can utilize the knowledge base to analyze the spatial relationship or the semantic relationship represented by the traffic information to be processed and thus can process the traffic information inconsistent in space, time and semantic, thereby providing accurate and complete traffic information with a high reliability.

While FIG. 1 shows that the knowledge base 108 is disposed inside the traffic information processing apparatus, the knowledge base 108 can be alternatively placed externally to the traffic information processing apparatus and accessed by the traffic information processing apparatus. Besides, a known knowledge base can be used.

Figure 6:
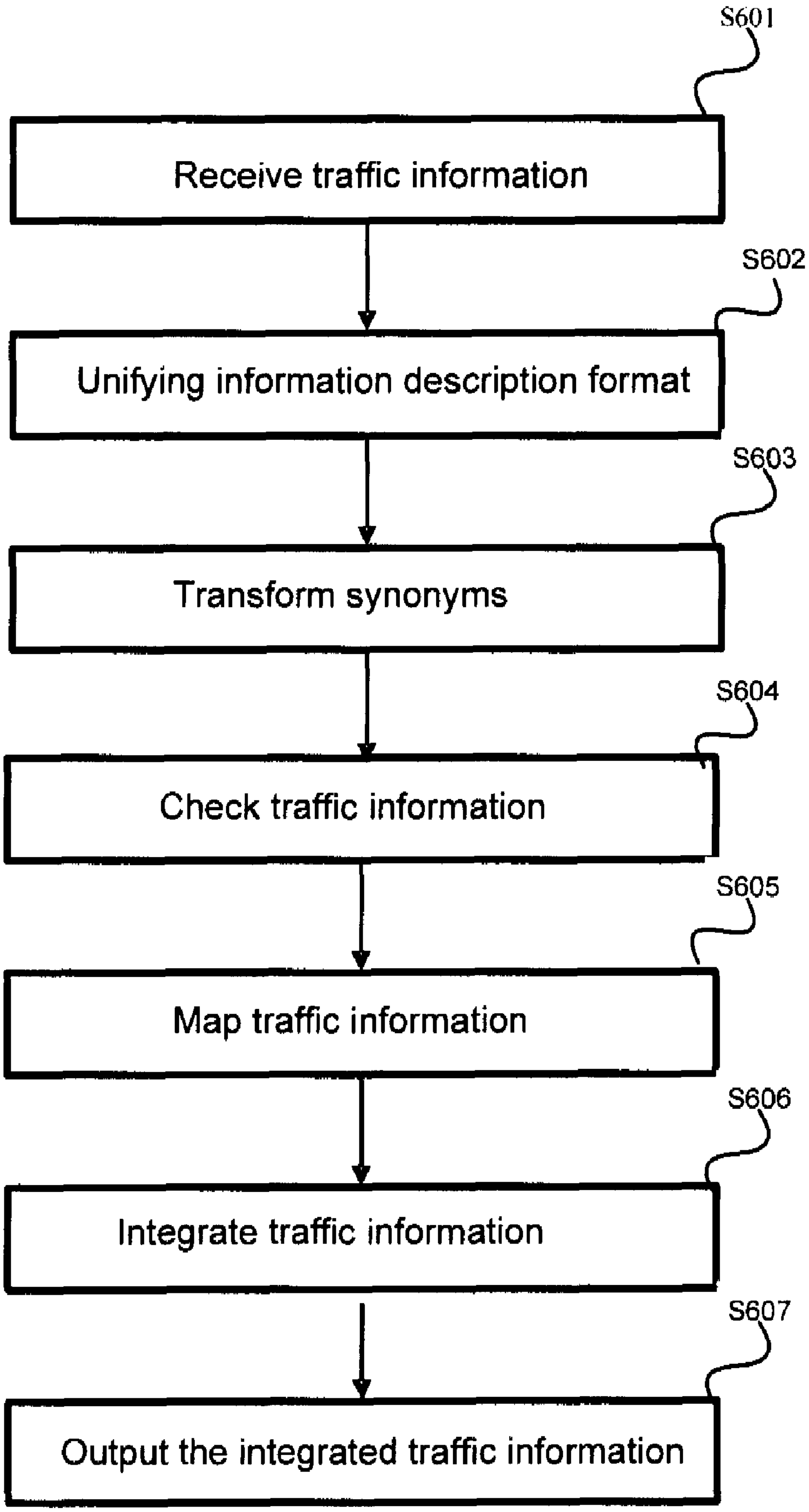
FIG. 6 shows a flowchart of a traffic information processing method according to the present invention.

FIG. 6 shows a traffic information processing method according to the present invention. As shown in FIG. 6, at S601, the input device 101 receives the traffic information transmitted from a plurality of external heterogeneous information sources.

Figure 5:
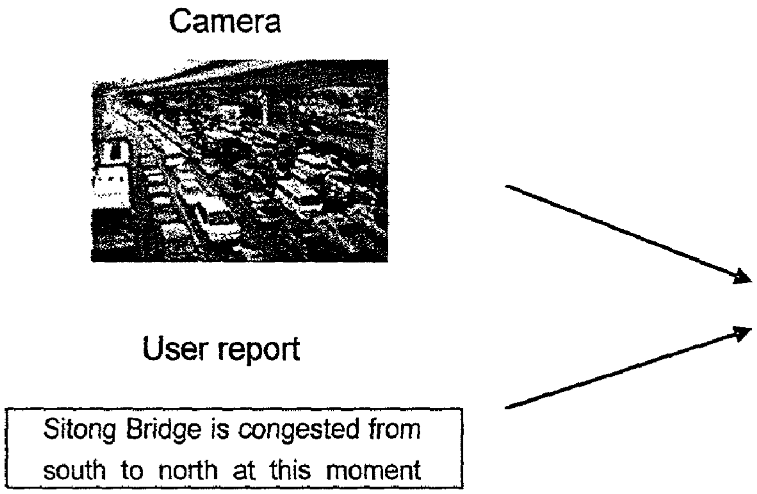
FIG. 5 shows an example of the unified format of traffic information.

At S602, the format unifying device 102 unifies the information description formats of the input traffic information with different formats. FIG. 5 shows an example of the information description format of the traffic information with unified format. Since the external heterogeneous information sources differ from each other, the gathered traffic information has different information description formats, such as a picture format, a natural language text format, a data table format or a voice format. These different information description formats can be transformed into unified data format through corresponding data processing approaches. The traffic information with unified format is usually composed of five parts, information source, location, direction, traffic status and time, in which the information source depicts which source the traffic information comes from, and the combination of location, direction, traffic and time describes "the traffic situation of a geographic entity in a certain direction at a moment". Different information description formats can be transformed into unified information description format of the traffic information by using known data processing methods.

Figure 7:
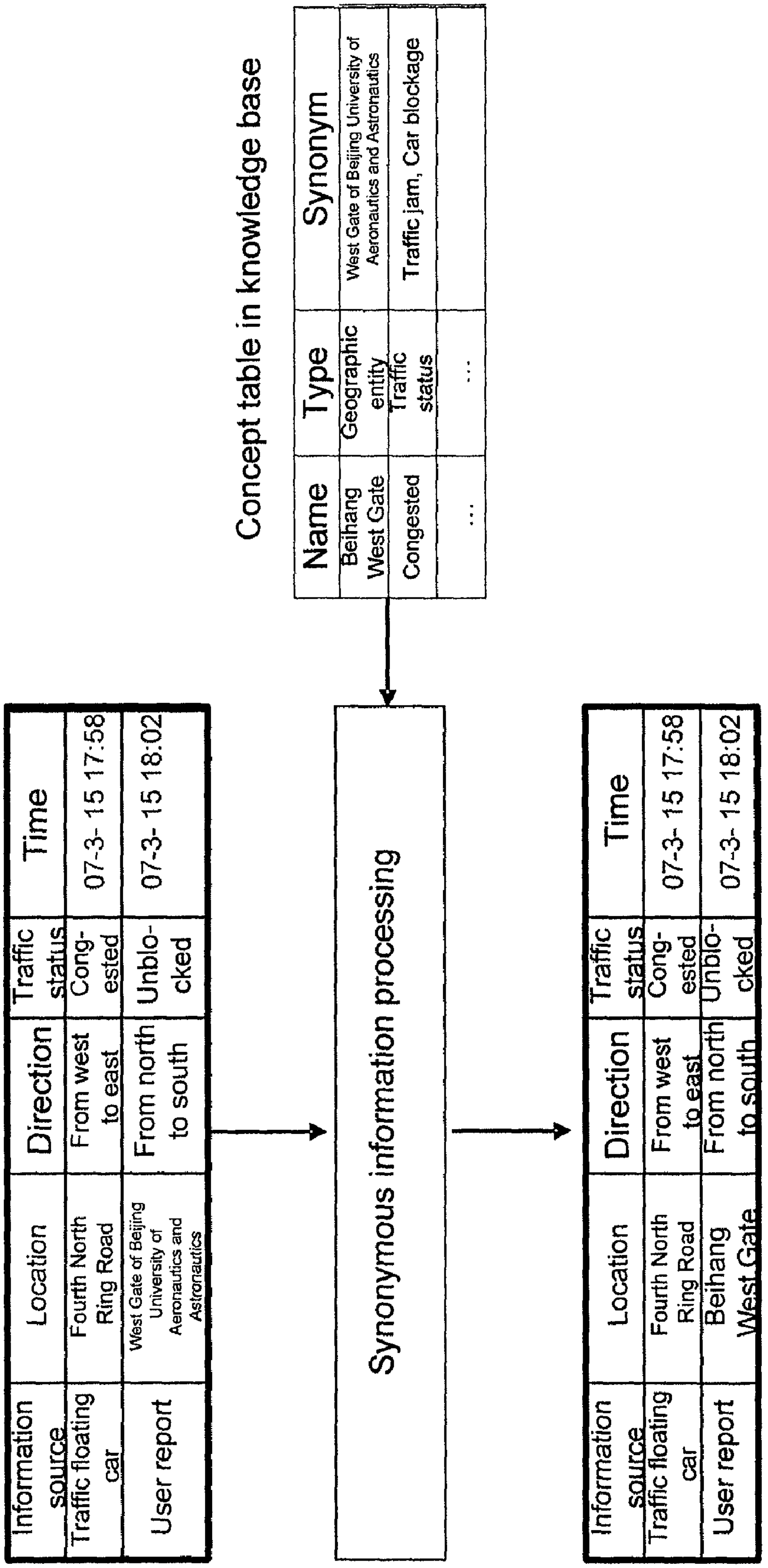
FIG. 7 shows an example of synonymous information processing.

At S603, the traffic information with unified format is transmitted to the synonymous information processing device 103, which searches the concept table in the knowledge base. The synonyms in the traffic information can be found by searching the definitions of synonyms of respective concepts in the concept table, and then the synonymous information processing device 103 transforms these synonyms into the concepts defined in the knowledge base. As such, for the traffic information which may contain words of different description forms but the same semantic, the synonyms in the traffic information are normalized to maintain unified description. FIG. 7 shows an example of synonymous information processing, where "West Gate of Beijing University of Aeronautics and Astronautics" is normalized as "Beihang West Gate", and "car blockage" as "congested".

At S604, the checking device 104 checks whether every piece of traffic information is legal and valid so as to ensure the accuracy of the traffic information. The checking 104 performs the following checking on the traffic information 1. Existence checking: checking whether the locations, directions and traffic status contained in the traffic information have been defined in the concept table of the knowledge base, and if there is any undefined concept, determining by the checking device 104 whether any error occurs in the traffic information or the concept definition in the concept table of the knowledge base is incomplete.

The detailed determination approach is as follows. The checking device 104 searches the knowledge base, and misspelling may occur in the traffic information if the concept table of the knowledge base includes any concept similar to the undefined one; if the undefined concept has been appeared several times in the history traffic database, this concept may be valid, and the concept definition in the concept table of the knowledge base may not be complete. Alternatively, this determination can be done by an administrator. As an example, "Xueyuan" in "camera, Xueyuan, congested, 07-3-15 07:56" has no definition, and there are similar concepts "Xueyuan Road" and "Xueyuan Bridge" in the knowledge base, "Xueyuan" may be thus misspelled.

2. Completeness checking. A complete piece of traffic information must contain location, traffic status and time, and it may also contain information source and direction. The checking device 104 will discard the traffic information if it is incomplete. For example, "camera, Xueyuan Bridge, 07-3-15 07:56" is not complete since it lacks the description of traffic status.

3. Semantic error checking. The checking device 104 checks whether any semantic error is included in the traffic information based on the knowledge base. Checking whether any semantic error is present comprises:

checking whether the relation among several geographic entities in the traffic information is correct, based on the spatial relationship between geographic entities as defined by the relation section in the knowledge base; as an example, "user report, Lianxiang Bridge on the Fourth North Ring Road, congested, 07-3-15 07:56" is wrong semantically since Lianxiang Bridge lies on the Third North Ring Road;

checking whether the geographic directions are consistent with the geographic entities in the traffic information, based on the relationship between geographic entities and geographic directions as defined by the relation section in the knowledge base; as an example, "camera, Xueyuan Road, from west to east, congested, 07-3-15 07:56" is wrong semantically since the direction of Xueyuan Road is from south to north.

4. Time expiration checking. The update speed of traffic information is very quick, and it is thus necessary to check whether the traffic information transmitted by each information source has been expired. Determining the expiration of traffic information is fulfilled by comparing the time value in the traffic information with the current time. If the difference between the time value included in the traffic information and the current time of the apparatus exceeds a predetermined threshold, it is determined that the traffic information has been expired.

5. Redundancy checking. The heterogeneous information sources may transmit repetitive traffic information, and it is necessary to delete the repeated and redundant information.

Further, the reliability of each information source can be determined and adjusted with reference to the history statistics of information checking. For example, if the information source "user report" frequently transmits some illegal traffic information, it is determined that this information source has a low reliability, and thus a lower value can be set for the reliability of this source.

At S605, the knowledge base mapping device 105 normalizes the traffic information and maps it to the knowledge base.

At S606, the traffic information integrating device 106 integrates the traffic information inconsistent in space, time and semantic based on the knowledge base 108.

At S607, the output device 107 outputs the integrated traffic information.

While the gathering and processing of traffic information are illustrated by example of Chinese traffic information, it is apparent in the art that the present invention can be applied to the traffic information gathering and processing in any other language, such as English and Japanese.

Figure 8:
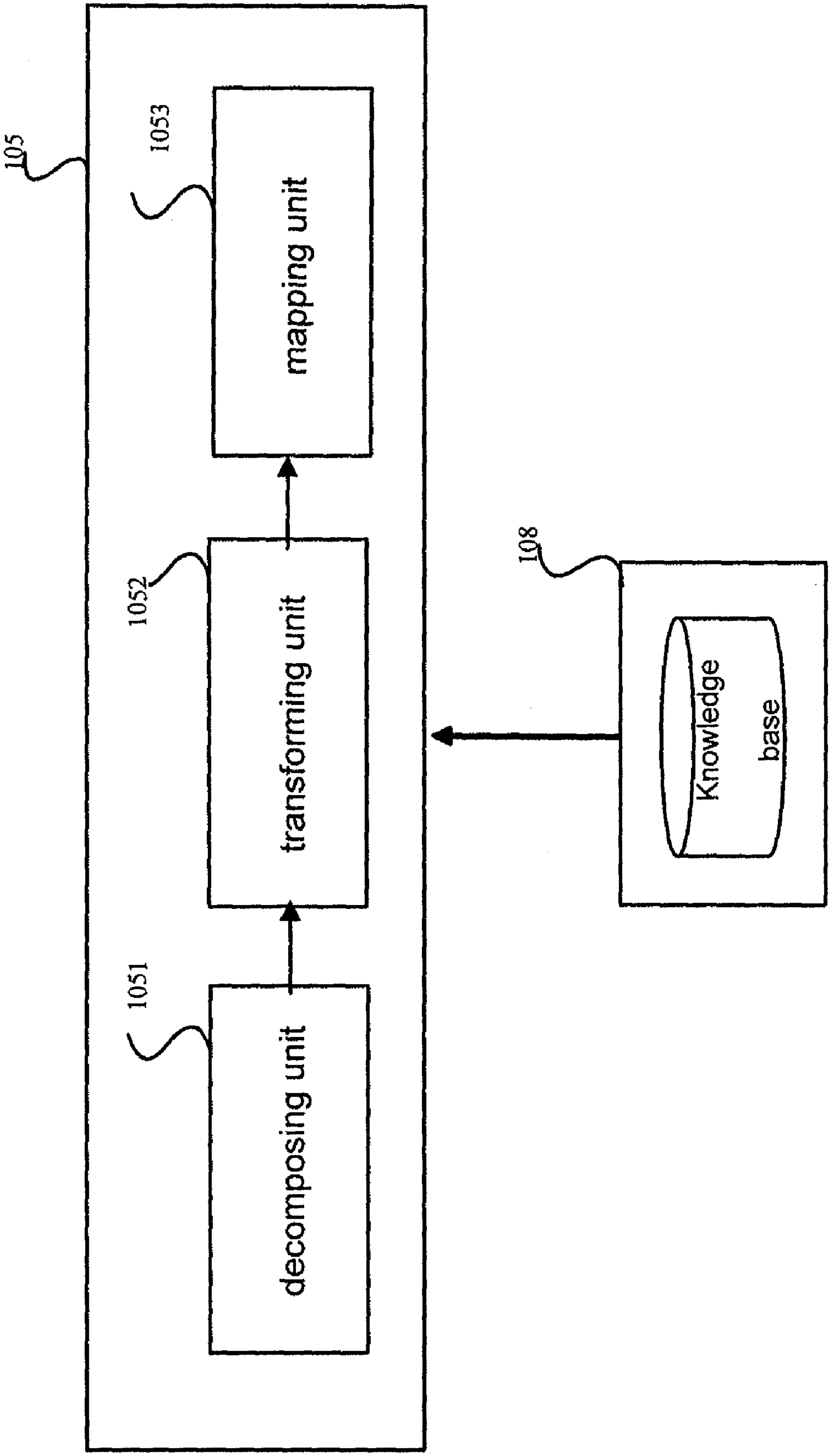
FIG. 8 is a schematic diagram of a knowledge base mapping device according to the present invention.

FIG. 8 shows a block diagram of the knowledge base mapping device in the traffic information processing apparatus according to the present invention. The knowledge base mapping device maps each piece of traffic information to the knowledge base for the subsequent information integration, and it comprises a decomposing unit 1051 for decomposing the combined information in the traffic information based on the knowledge base, transforming unit 1052 for transforming the indirect information in the traffic information into specific traffic information based on the knowledge base, and a mapping unit 1053 for mapping the decomposed or transformed traffic information to an electronic map.

Figure 9:
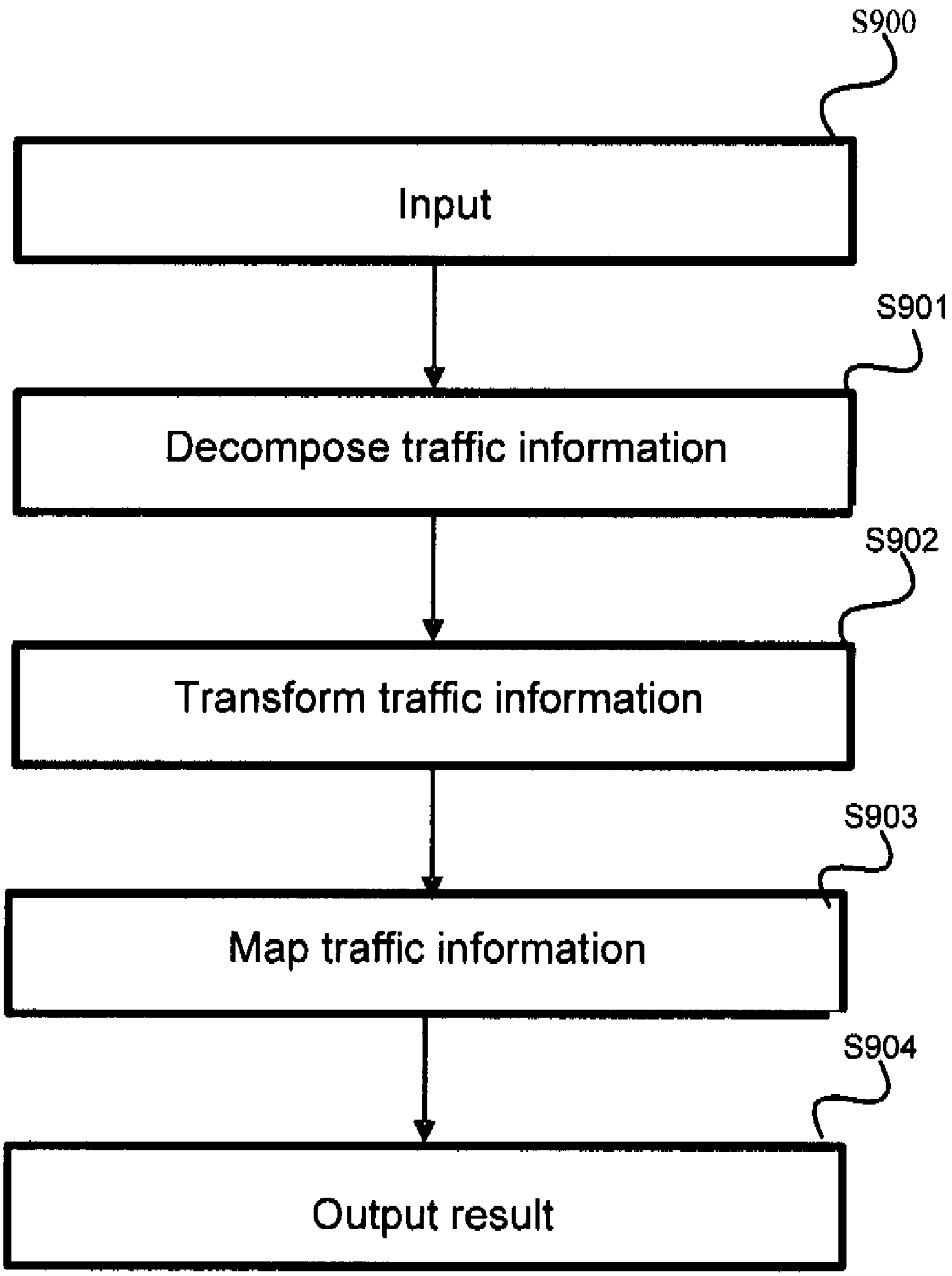
FIG. 9 is a schematic diagram of a knowledge base mapping method according to the present invention.

Next, a description will be given to the knowledge base mapping method in conjunction with FIGS. 8 and 9. Referring to FIG. 9, the knowledge base mapping device receives the traffic information checked by the checking device 104 at S900. at S901, the decomposing unit 1051 utilizes the knowledge base 108 to decompose the combined information contained in the traffic information needed to be decomposed into the traffic information regarding specific geographic points. The combined information means that the geographic entity described in the traffic information is not a specific geographic point but a road section or a region, where the geographic point denotes a point on a map, and the point on a map comprises a bridge, an intersection and a geographic object. Therefore, a geographic point depicts a geographic entity which is neither a line nor a plane. On the basis of the relation section in the knowledge base 108, the decomposing unit 1051 can determine whether the traffic information contains any specific geographic point, and, if the answer is YES, decompose the geographic entity in the combined information into specific geographic points according to preset decomposing rules. For example, the traffic information "traffic floating car, the Fourth North Ring Road, from west to east, congested, 07-3-15 08:45" comprises combined information since the Fourth North Ring Road represents a road. Now, the relation table in the relation section of the knowledge base can be utilized to decompose "the Fourth North Ring Road" into specific geographic points, such as "Baofushi Bridge", "Xueyuan Bridge", "Jianxiang Bridge" and the like, all of which are located on "the Fourth North Ring Road". Decomposing rules can be provided in the axiom section of the knowledge base in accordance with the spatial relationship therein or be provided in a memory. The rules can be represented as "isa(x, z) & R(x, $y_1$, $y_2$, . . . )→decompose-to ($y_1$, $y_2$, . . . )", which means that "x can be decomposed into $y_1$, $y_2$, . . . if x belongs to geographic category z and has spatial relationship R with the specific points $y_1$, $y_2$, . . . ." For the combined information "the Fourth North Ring Road" in the traffic information "traffic floating car, the Fourth North Ring Road, from west to east, congested, 07-3-15 08:45", based on the knowledge base and by using the decomposing rule "isa (x, road) & cross (x, $y_1$, $y_2$, . . . )→decompose-to ($y_1$, $y_2$, . . . )", it can be decomposed into specific geographic points, such as "Baofushi Bridge", "Xueyuan Bridge", "Jianxiang Bridge" and the like, all of which are located on "the Fourth North Ring Road".

At S902, the transforming unit 1052 transforms the indirect information in the traffic information into traffic points based on the knowledge base 108. The indirect information means that the geographic entities described in the traffic information are actually not traffic points (e.g., a bridge or an intersection) but geographic objects near these traffic points. Therefore, it is necessary to transform the indirect information into the traffic information about some traffic points. For example, the indirection information "Beihang West Gate" contained in the traffic information "user report, Beihang West Gate, from north to south, unblocked, 07-3-15 09:12" is not a traffic point but a geographic object near the traffic point "Xuezhi Bridge". The transforming unit 1052 determines whether any indirect information is included in the traffic information based on the relation section defined in the knowledge base 108, and, if there is indirect information, transforms it into a specific traffic point according to a transforming rule on the basis of the knowledge base. The transforming rule can be set in the axiom section of the knowledge base according to the spatial relationship in the knowledge base or can be set in a memory. The transforming rule is represented as "isa(x, z) & R(x, y)→transform-to (y)", which denotes that "x will be transformed into y if x belongs to geographic category z and has spatial relationship R with traffic point y". As such, by using the transforming rule "isa(x, geographic object) & nearest-bridge (x, y)→transform-to (y)", the indirection information "Beihang West Gate" contained in the traffic information "user report, Beihang West Gate, from north to south, unblocked, 07-3-15 09:12" can be transformed into its nearest point "Xuezhi Bridge".

Based on the decomposition and transformation of the traffic information, the association between respective pieces of traffic information can be found out so as to facilitate the traffic information integration by the traffic information integrating device 106.

Next, at S903, the mapping unit 1053 maps all the traffic information to the electronic map in accordance with the longitude and latitude coordinates of geographic entities as well as the spatial relationship between geographic entities defined in the attribute and relation sections of the knowledge base. FIG. 10 shows an example of mapping the traffic information to the electronic map. The user or the administrator can check and confirm easily the traffic information resulting from such mapping based on the electronic map. As shown in FIG. 10, the traffic information "traffic floating car, the Fourth North Ring Road, from west to east, congested, 07-3-15 08:45" has been decomposed into "traffic floating car, Baofushi Bridge, from west to east, congested, 07-3-15 08:45", "traffic floating car, Xueyuan Bridge, from west to east, congested, 07-3-15 08:45", "traffic floating car, Jianxiang Bridge, from west to east, congested, 07-3-15 08:45" and the like. On the other hand, the traffic information "user report, Beihang West Gate, from north to south, unblocked, 07-3-15 09:12" has been transformed and then mapped to "user report, Xuezhi Bridge, from north to south, unblocked, 07-3-15 09:12".

At S904, the knowledge base mapping device 105 outputs the mapped traffic information to the traffic information integrating device 106.

It should be noted that this knowledge base mapping device 105 is illustrated merely as an example. The mapping unit 1053 can be omitted so that the knowledge base mapping device 105 can output the combination of decomposed and transformed traffic information directly to the traffic information integrating device 106. Alternatively, the knowledge base mapping device 105 can also include only the decomposing unit 1051 or the transforming unit 1052.

Figure 11:
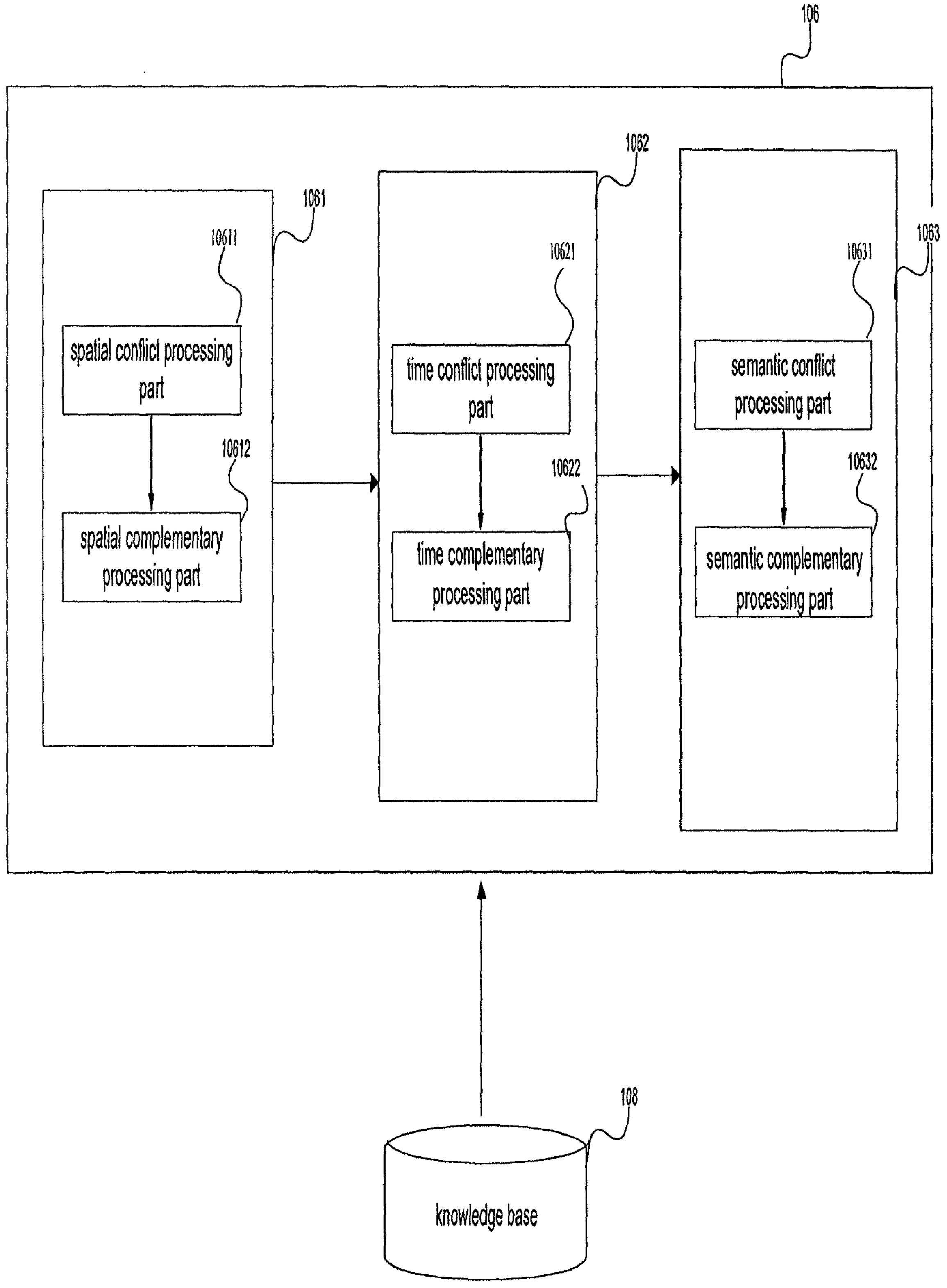
FIG. 11 is a schematic diagram of a traffic information integrating device according to the present invention.

Referring to FIG. 11, the traffic information integrating device 106 comprises an input unit (not shown) for receiving the mapped traffic information, a spatial consistency processing unit 1061 for performing consistency processing on the traffic information which is spatially correlated but inconsistent in traffic description, a time consistency processing unit 1062 for performing consistency processing on the traffic information which is inconsistent in traffic status at certain period, a semantic consistency processing unit 1063 for performing consistency processing on the traffic information which is inconsistent semantically in traffic status, and an output unit (not shown) for outputting the integrated traffic information. The spatial consistency processing unit 1061 includes a spatial conflict processing part 10611 and a spatial complementary processing part 10612, the time consistency processing unit 1062 includes a time conflict processing part 10621 and a time complementary processing part 10622, and the semantic consistency processing unit 1063 includes a semantic conflict processing part 10631 and a semantic complementary processing part 10632.

Figure 12:
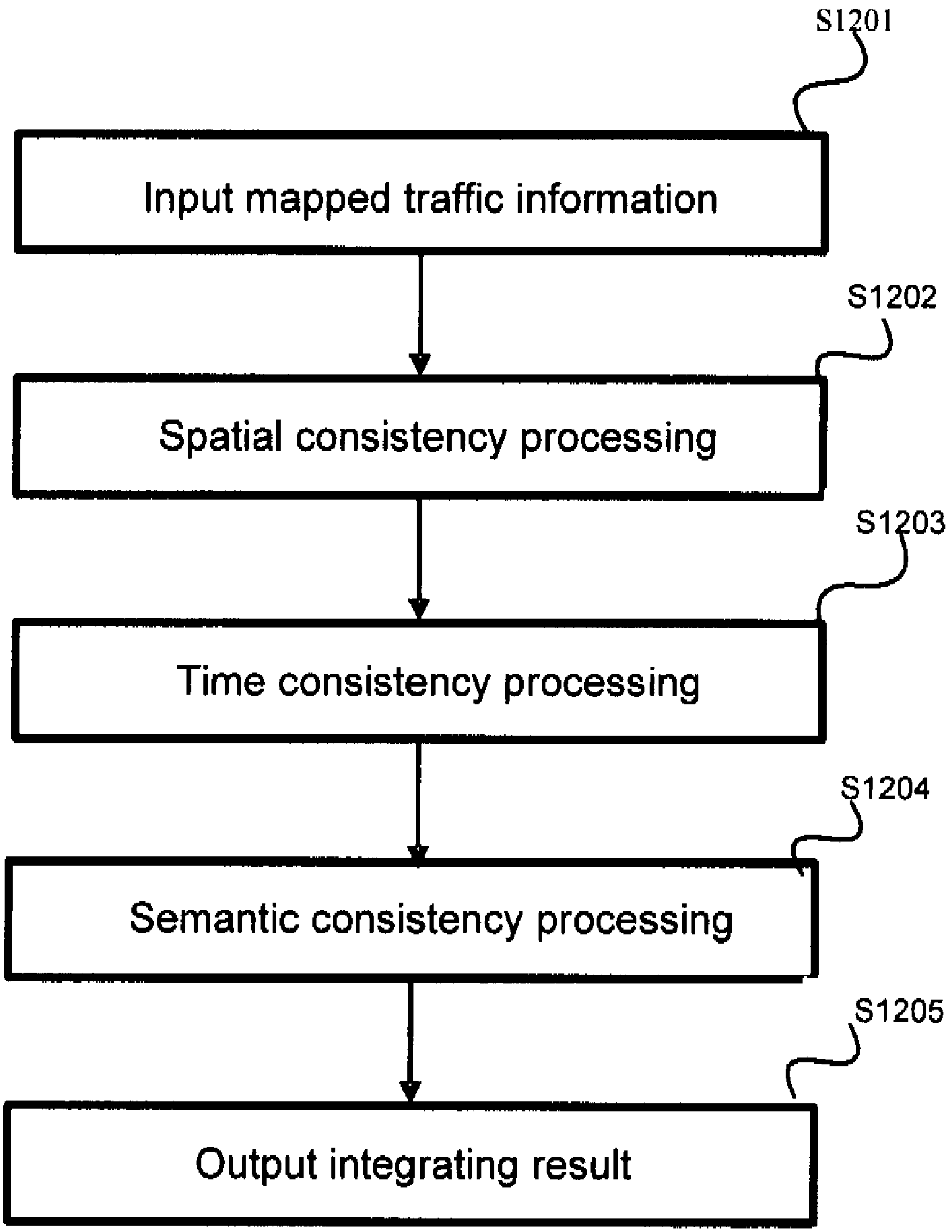
FIG. 12 shows a flowchart of a traffic information processing method.

FIG. 12 is a flowchart showing how the traffic information integrating device 106 integrates the traffic information.

At S1201, the traffic information is inputted from the knowledge base mapping device 105.

At S1202, the spatial consistency processing unit 1061 integrates the spatially inconsistent traffic information based on the knowledge base 108 to obtain a spatially consistent result. The spatial conflict processing part 10611 and the spatial complementary processing part 10612 in the spatial consistency processing unit 1061 conduct spatial conflict processing and spatial complementary processing on the traffic information, respectively, so as to acquire spatially-related traffic information which is consistent in space.

In particular, the spatial conflict processing carried out by the spatial conflict processing part 10611 comprises correcting the contradict traffic description information in several pieces of spatially-related traffic information. If a location has a different traffic description from those of locations spatially related to the location (i.e., locations adjoining the location) at adjoining moments, the spatial conflict processing part 10611 corrects such traffic description information as follows.

Spatial conflict detection: first, extracting locations contained in the respective pieces of traffic information, and finding out the adjoining relationship between these locations by referring to the spatial relationship defined in the relation section of the knowledge base; then, for each of these locations, comparing its traffic with those of the adjoining locations at adjoining moments, and confirming the occurrence of spatial conflict if the traffic of the location is different from those of most of the adjoining locations.

Spatial conflict elimination: correcting the traffic information of the location having spatial conflict to be consistent with the traffic information of most of the adjoining locations. Alternatively, it can be determined whether to perform the spatial conflict elimination in accordance with reliability of information sources as well as comparison with history traffic data. For example, if the current traffic information about a location is inconsistent with that of several adjacent locations, the traffic information originates from an unreliable information source (e.g., user report), and the traffic information is not consistent with its history traffic data, either, it is necessary to correct the traffic information so as to maintain consistence with the traffic information about the adjacent locations.

FIG. 13(*a*) shows an example of the spatial conflict processing on the traffic information. As can be seen from the spatial relationships "between (Xueyuan Bridge, Baofushi Bridge, Jianxiang Bridge)" and "between (Xuezhi Bridge, Xueyuan Bridge, Jimen Bridge)", the locations adjacent to the Xueyuan Bridge include Baofushi Bridge, Jianxiang Bridge, Xuezhi Bridge and Jimen Bridge. The traffic status (unblocked) of Xueyuan Bridge from user report is inconsistent with the traffic status (congested) of the adjacent traffic point (Baofushi Bridge, Jianxiang Bridge, Xuezhi Bridge), and the traffic information comes from a relatively unreliable information source "user report". Further, it can be derived from the history traffic data that the history traffic of Xueyuan Bridge at this moment is mainly congested. Therefore, the spatial consistency processing unit 1061 corrects the traffic status in the traffic information about "Xueyuan Bridge" to be "congested".

The spatial complementary processing conducted by the spatial complementary processing part 10612 includes correcting incomplete traffic description information in several pieces of spatially-related traffic information. For a location with no traffic information provided, its traffic information can be deduced from that of the adjoining locations (spatially-related locations). The specific steps by the spatial complementary processing part 10612 comprises:

deducing based on rules: matching the traffic information transmitted from respective information sources with a rule library established in advance in conjunction with the spatial relationship defined in the relation section of the knowledge base; finding a matched rule, and generating new traffic information based on the rule. Alternatively, the history traffic database can be search simultaneously, and the newly-generated traffic information must be discarded if it is not consistent with the history traffic information at this moment or if it has existed.

The rule library is configured in advance based on the spatial relationship defined in the knowledge base. For example, the rule library can be set in the axiom section of the knowledge base or stored in a memory. A spatial complementary rule library can be preset in accordance with the spatial relationship defined in the knowledge base. For example, the complementary rule "between (z, x, y) & near (x, y) & equal (traffic (x), traffic (y))→equal (traffic (z), traffic (x))" means "it can be deduced that the traffic of the location z is the same as the location x if z lies between x and y, x is near y, and the traffic of x and y is the same at adjacent moments".

FIG. 13(*b*) shows an example of spatial complementary processing, in which the traffic status of Xueyuan Bridge and Jimen Bridge is the same (congested) at 17:58, 07-3-15, the two bridges are not far from each other. Since Xuezhi Bridge is located between them, and most of history traffic status of Xuezhi Bridge at this time is congested, a new piece of traffic information can be complemented as "Xuezhi Bridge, from north to south, congested, 07-3-15 17:58".

At S1203, the time consistency processing unit 1062 integrates the temporally inconsistent traffic information. The time conflict processing part 10621 and the time complementary processing part 10622 in the time consistency processing unit 1062 conduct time conflict processing and time complementary processing on the traffic information, respectively, so as to acquire the traffic information which is consistent in time.

The time conflict processing part 10621 in the time consistency processing unit 1062 processes the traffic information of which the description is inconsistent for the same location at different moments based on the knowledge base 108. The processing steps by the time conflict processing part 10621 comprise:

1) clustering, that is, clustering the traffic information about the same location: first, clustering the input traffic information in terms of location, gathering the traffic information about the same location into the same category, each category containing the traffic information of the same location at different moments; alternatively, plotting a traffic data graph, that is, for each category, automatically plotting a traffic data graph based on the traffic statuses of the location at different moments, with time being x-axis and traffic status being y-axis; the traffic data graph depicts the traffic status of a certain location changing with time.

As an alternative, besides the clustering of the input traffic information directly in accordance with location, the history traffic database can be referred to, and the traffic information of each location at the previously adjacent time can be classified into the category regarding this location.

2) conflict seeking, that is, seeking temporally-inconsistent traffic information: for each category, finding a coordinate point having a traffic status inconsistent with that at adjacent moments in the traffic data graph, the corresponding traffic information being time conflict information.

3) time conflict elimination, that is, eliminating the time conflict traffic information: correct such traffic information to keep consistent with the traffic information at adjacent moments. Alternatively, the processing on temporally-inconsistent information can be done simultaneously in accordance with reliability of information sources as well as comparison with history traffic data. If the temporally-inconsistent information originates from an unreliable information source, or it is not consistent with its history traffic data at the same moment, there must be some error in the traffic information, and it is necessary to correct the traffic information so as to maintain consistence with the traffic information at adjacent moments.

FIG. 14(*a*) shows an example of the time conflict processing. For the location "Xuezhi Bridge" in the traffic information, its traffic statuses are congested at 17:58, 18:00 and 18:01, while a piece of traffic information from user report is that the traffic status is unblocked at 17:59. Since the traffic status of Xuezhi Bridge is congested in most cases as can be seen from the history traffic data, and the information source "user report" has a low reliability, the traffic status at 17:59 is correct as congested.

The time complementary processing part 10622 of the time consistency processing unit 1062 handles, based on the knowledge base 108, the situation where the traffic information of a location at certain time is absent. The steps by the time consistency processing unit 1062 comprise:

1) clustering, that is, clustering the traffic information about the same location: first, clustering the input traffic information in terms of location, gathering the traffic information about the same location into the same category, each category containing the traffic information of the same location at different moments; alternatively, plotting a traffic data graph, that is, for each category, automatically plotting a traffic data graph based on the traffic statuses of the location at different moments, with time being x-axis and traffic status being y-axis; the traffic data graph depicts the traffic status of a certain location changing with time.

As an alternative, besides the clustering of the input traffic information directly in accordance with location, the history traffic database can be referred to, and the traffic information of each location at the previously adjacent time can be classified into the category regarding this location.

2) absence information seeking, that is, seeking the traffic information absent at certain time point or the traffic information lacking traffic status: for each category, finding the absent coordinate points in the traffic data graph.

3) deducing: analyzing in the traffic data graph the traffic statuses of the coordinate points adjacent to each absent coordinate point, adding new traffic information or complementing the traffic information lacking traffic status if the traffic information of these adjacent coordinate points is substantially identical, with the location in the added or complemented traffic information being the location corresponding to one of the adjacent coordinate points, the time being the moment corresponding to the absent coordinate point, and the traffic status being that of the adjacent coordinate points.

As an alternative, the history traffic database can be referred to, and the newly-added traffic information must be discarded if it is not consistent with the history traffic information at this moment or if it has existed.

FIG. 14(*b*) shows an example of time complementary processing. For the location "Xueyuan Bridge" in the traffic information, its traffic statuses are congested at 8:20, 8:21 and 8:23, while its traffic information at 8:22 is not present. Since the traffic statuses at adjacent moments are congested, a piece of traffic information is added as "integrating result, Xueyuan Bride, from west to east, congested, 07-3-15 8:22".

At S1204, the semantic consistency processing unit 1063 processes the traffic information, which is about the same location but inconsistent in traffic status, into semantically consistent traffic information based on the knowledge base 108. The semantic consistency processing unit 1063 integrates the semantically inconsistent traffic information by correcting the traffic information which is inconsistent regarding the same location. The semantic conflict processing part 10631 and the semantic complementary processing part 10632 conduct semantic conflict processing and semantic complementary processing on the traffic information, respectively, so as to acquire traffic information which is consistent in semantics.

The semantic conflict processing part 10631 finds out the semantically conflicting traffic information and then eliminates such semantic conflict through the following steps:

1) semantic conflict determination, that is, determining whether there is semantic conflict between at least two pieces of traffic information. For the same location, different information sources provide contradict traffic descriptions at adjacent moments, while only one description is proper. The approach is to determine this according to specific semantic relationship between different traffic statuses defined in the relation section of the knowledge base 108. As an example, referring to the relation table shown in FIG. 4(*b*), "congested" is opposite to "unblocked", there is thus semantic conflict between the traffic information "traffic floating car, Xuezhi Bridge, from west to east, congested, 07-3-15 17:58" and "user report, Xuezhi Bridge, from west to east, unblocked, 07-3-15 17:58".

2) semantic conflict elimination: determining the reliability of semantically conflicting traffic information, and then retaining the most reliable information. The reliability determination for traffic information can be done in accordance with the following rules:

reliability of information source, that is, selecting the traffic information transmitted from a reliable information source. The reliability of an information source is calculated from the provider, data update speed and history information.

For example, the provider of information source "user report" is ordinary user, the update speed is low, and such source often transmits some illegal or inaccurate traffic information. So, the reliability of "user report" is low, and the reliability of the traffic information from it is accordingly low.

Time comparison, that is, the nearer the time value in the traffic information is with respect to the current moment of the apparatus, the more reliable the traffic information is.

Majority having priority, that is, if different information sources provide different descriptions about the traffic status of the same location at adjacent moments, the majority has priority. For example, if most information sources consider a location as congested at the moment, only a few sources reports that this location has no congested, the traffic status of congestion is more reliable.

Comparison with history traffic data, that is, comparing the traffic information with the history traffic data of the same location at this moment. The more consistent the two pieces of information are, the more reliable the traffic information is.

The semantic complementary processing part 10632 finds the traffic information semantically complementary to each other and then combine such information in a semantic sense. The involved steps comprise:

1) semantic complementary determination, that is, determining whether there is semantic complement between at least two pieces of traffic information. The occurrence of semantic complement is characterized in that, for the same location, different information sources provide traffic descriptions which are different but complementary to each other at adjacent moments, and these descriptions are all proper. The approach is to determine according to specific semantic relationship between different traffic statues defined in the relation section of the knowledge base 108. As an example, referring to the relation table shown in FIG. 4(*b*), "congested" and "traffic accident" are cause and effect, there is thus semantic complement between the traffic information "traffic floating car, Xuezhi Bridge, from west to east, congested, 07-3-15 17:58" and "camera, Xuezhi Bridge, from west to east, traffic accident, 07-3-15 17:58".

2) semantic complementary combination, that is, for the traffic information semantically complementary to each other, combining the traffic statuses based on specific semantic relationship between the traffic statuses. Combination rules can be pre-established according to various semantic relationships. For example, "causal (x, y)→generate ("x resulting from y")" denotes that, if y is the reason for x, x and y can be combined as "x resulting from y". Since causal (congested, traffic accident), "congested" and "traffic accident" can be combined as "congested resulting from traffic accident". The combination rules can be set in the axiom section of the knowledge base.

FIG. 15 shows an example of semantic consistency processing, in which two pieces of traffic information, "traffic floating car, Xuezhi Bridge, from west to east, congested, 07-3-15 17:58" and "user report, Xuezhi Bridge, from west to east, unblocked, 07-3-15 17:58", are contradict to each other. Since the latter comes from the information source "user report" with a low reliability, the current time is the rush hour when people go home after work, the history data are mostly congested, the latter traffic information should be deleted. Further, "traffic floating car, Xuezhi Bridge, from west to east, congested, 07-3-15 17:58" and "camera, Xuezhi Bridge, from west to east, traffic accident, 07-3-15 17:58" are complementary to each other. Referring to the relation table shown in FIG. 4(*b*), the semantic relationship between "congested" and "traffic accident" is causal, the two pieces of traffic information can thus be combined as "integrating result, Xuezhi Bridge, from west to east, congested resulting from traffic accident, 07-3-15 17:58".

Figure 16:
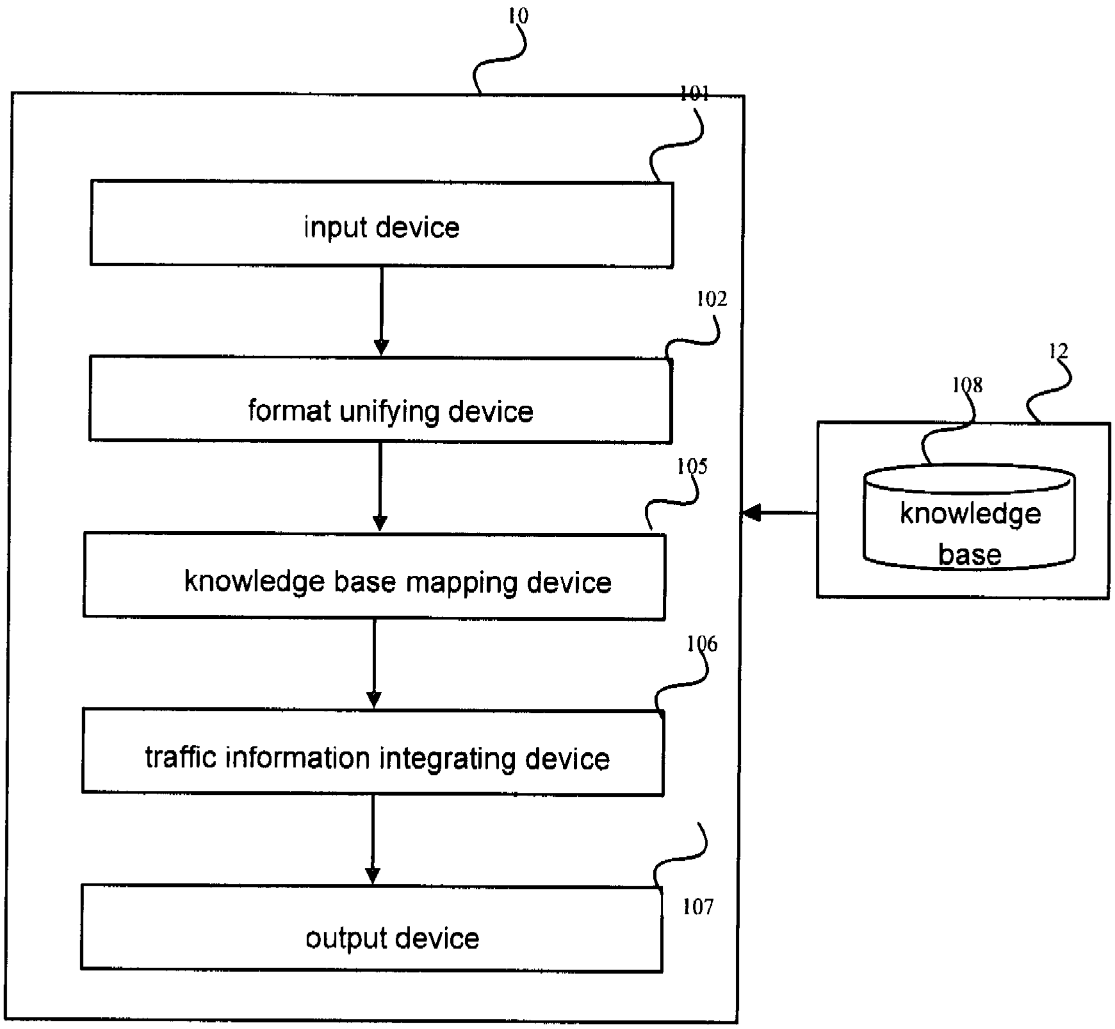
FIG. 16 shows a schematic diagram of a traffic information processing apparatus according to another embodiment of the present invention.

FIG. 16 shows a schematic diagram of a traffic information processing apparatus according to another embodiment of the present invention. Compared with the traffic information processing apparatus in FIG. 1, the traffic information processing apparatus in FIG. 16 comprises merely the input device 101, the format unifying device 102, the knowledge base mapping device 105, the traffic information integrating device 106, the output device 107 and the knowledge base 108. The difference between the two processing apparatuses lies in that, in the latter apparatus, the input traffic information undergoes format unifying by the format unifying device 102 and is then directly transmitted to the knowledge base mapping device 105, which maps the traffic information with unified format to the traffic information defined in the knowledge base by utilizing the knowledge base and then transmits the mapped traffic information to the traffic information integrating device 106. As another configuration, the traffic information processing apparatus 10 can include only the input device 101, the traffic information integrating device 106 and the output device 107 to process the traffic information with unified format. For the purpose of clarity, the similar description of the above devices is not repeated. Alternatively, the knowledge base 108 can be provided externally to the traffic information processing apparatus, though it is placed inside the traffic information processing apparatus in FIG. 16.

With the traffic information processing apparatus and method of the present invention, it is possible to integrate effectively the traffic information from a variety of heterogeneous information sources and ensure the accuracy, completeness and reliability of traffic information.

Although the present invention has been illustrated above with reference to the detailed embodiments, the present invention is not limited to the described embodiments and defined only by the appended claims. It will be understood that any modification and change made to the embodiments by those skilled in the art within the scope and spirit of the present invention.

What is claimed:

1. A traffic information processing apparatus, comprising:

a format unifying device which unifies input traffic information with different formats to traffic information with unified format; and a traffic information integrating device which corrects or complements the traffic information with unified format based on a knowledge base to obtain traffic information which is consistent with each other, so as to integrate the traffic information, wherein the knowledge base is external to the apparatus or internal to the apparatus, wherein the traffic information integrating device receives a plurality of pieces of the traffic information with the unified format relating to a location, compares traffic status for the location included in a first piece among the plurality of pieces of traffic information with traffic status included in other pieces of the traffic information relating to the location, determines whether there is a conflict between the first piece of the traffic information and the other pieces of the traffic information, and corrects or complements the first piece of the traffic information to be consistent with the other pieces of the traffic information.

2. The apparatus according to claim 1, further comprising:

a knowledge base mapping device connected to the format unifying device which maps the traffic information with unified format to the traffic information defined in the knowledge base by using the knowledge base, and transmits the mapped traffic information to the traffic information integrating device.

3. The apparatus according to claim 1, further comprising:

a synonymous information processing device connected to the format unifying device which transforms synonymous descriptions in the traffic information with unified format to identical description information, and transmits the transformed traffic information to the traffic information integrating device.

4. The apparatus according to claim 3, further comprising:

a checking device connected to the format unifying device which performs on the transformed traffic information at least one of the checking processes: existence checking, completeness checking, semantic error checking, time expiration checking, and redundancy checking, and then transmits the checked traffic information to the traffic information integrating device.

5. The apparatus according to claim 1, further comprising:

a synonymous information processing device connected to the format unifying device which transforms the synonymous descriptions in the traffic information with unified format to identical description information, and transmits the transformed traffic information to the checking device; and a checking device which performs on the transformed traffic information at least one of the checking processes: existence checking, completeness checking, semantic error checking, time expiration checking, and redundancy checking, and then transmits the checked traffic information to the traffic information integrating device.

6. The apparatus according to claim 2, wherein the knowledge base mapping device comprises:

a decomposing unit which decomposes the traffic information containing combined information into the traffic information of the geographic points defined in the knowledge base according to a relation table in the knowledge base, which describes relationship between concepts associated with traffic situations.

7. The apparatus according to claim 2, wherein the knowledge base mapping device comprises:

a transforming unit which transforms the traffic information containing indirect information to the traffic information of the traffic point defined in the knowledge base according to a relation table in the knowledge base, which describes relationship between concepts associated with traffic situations.

8. The apparatus according to claim 2, wherein the knowledge base mapping device comprises:

a decomposing unit which decomposes the traffic information containing combined information into the traffic information of the geographic points defined in the knowledge base according to a relation table in the knowledge base, which describes relationship between concepts associated with traffic situations; and a transforming unit which transforms the traffic information containing indirect information to the traffic information of the traffic point defined in the knowledge base according to the relation table in the knowledge base.

9. The apparatus according to claim 8, wherein the knowledge base mapping device further comprises:

a mapping unit which maps the decomposed or transformed traffic information to an electronic map by using the longitude and latitude information defined by attribute information in the knowledge base.

10. The apparatus according to claim 1, wherein the traffic information integrating device comprises:

an input unit which receives the traffic information with unified format;

a spatial conflict processing unit which detects the traffic information of which described spatial locations are adjoined but the traffic description are contradict with each other according to a relation table in the knowledge base, which describes relationship between concepts associated with traffic situations, and corrects the contradict traffic information so as to integrate the traffic information; and an outputting unit which outputs the integrated traffic information.

11. The apparatus according to claim 1, wherein the traffic information integrating device comprises:

an input unit which receives the traffic information with unified format;

a spatial complementary processing unit which detects the traffic information of which described spatial location are adjoined but the traffic description are not complete according to a relation table in the knowledge base, which describes relationship between concepts associated with traffic situations, and then generates complementary traffic information so as to form the integrated traffic information;

an outputting unit which outputs the integrated traffic information.

12. The apparatus according to claim 1, wherein the traffic information integrating device comprises:

an input unit which receives the traffic information with unified format;

a spatial conflict processing unit which detects the traffic information of which described spatial location are adjoined but the traffic description are contradict with each other according to a relation table in the knowledge base, which describes relationship between concepts associated with traffic situations, and corrects the contradict traffic information so as to integrate the traffic information;

a spatial complementary processing unit which detects the traffic information of which described spatial location are adjoined but the traffic description are not complete according to the relation table in the knowledge base, and generates complementary traffic information so as to form the integrated traffic information; and an outputting unit which outputs the integrated traffic information.

13. The apparatus according to claim 1, wherein the traffic information integrating device comprises:

an input unit which receives the traffic information with unified format;

a time conflict processing unit which corrects the traffic information that has time conflict with each other by comparing the traffic status about the same location on different time according to concept information in the knowledge base, so as to integrate the traffic information; and an outputting unit which outputs the integrated traffic information.

14. The apparatus according to claim 1, wherein the traffic information integrating device comprises:

an input unit which receives the traffic information with unified format;

a time complementary processing unit which adds new traffic information or complements the traffic information that lacks traffic status on a certain time by comparing the traffic information on adjacent time, so as to integrate the traffic information; and an outputting unit which outputs the integrated traffic information.

15. The apparatus according to claim 1, wherein the traffic information integrating device comprises:

an input unit which receives the traffic information with unified format;

a time conflict processing unit which corrects the traffic information that has time conflict with each other by comparing the traffic status about the same location on different time according to concept information in the knowledge base, so as to integrate the traffic information;

a time complementary processing unit which complements the traffic information that lacks traffic description on a certain time by comparing the traffic information on adjacent time, so as to integrate the traffic information; and an outputting unit which outputs the integrated traffic information.

16. The apparatus according to claim 1, wherein the traffic information integrating device comprises:

an input unit which receives the traffic information with unified format;

a semantic conflict processing unit which searches the traffic information that has semantic conflict with each other based on a relation table in the knowledge base, which describes relationship between concepts associated with traffic situations, and selects the traffic information having high reliability from the traffic information that has semantic conflict with each other, according to at least one of the determination conditions including the reliability of an information source, the majority having priority, comparison with the current time and comparison with the history traffic data, so as to integrate the traffic information; and an outputting unit which outputs the integrated traffic information.

17. The apparatus according to claim 1, wherein the traffic information integrating device comprises:

an input unit which receives the traffic information with unified format;

a semantic complementary processing unit which searches the traffic information that semantically complements with each other according to a relation table in the knowledge base, which describes relationship between concepts associated with traffic situations, and combines the traffic information that semantically implements with each other, so as to integrate the traffic information; and an outputting unit which outputs the integrated traffic information.

18. The apparatus according to claim 1, wherein the traffic information integrating device comprises:

an input unit which receives the traffic information with unified format;

a semantic conflict processing unit which searches the traffic information that has semantic conflict with each other based on a relation table in the knowledge base, which describes relationship between concepts associated with traffic situations, and selects the traffic information having high reliability from the traffic information that has semantic conflict with each other, according to at least one of the determination conditions including the reliability of an information source, the majority having priority, comparison with the current time and comparison with the history traffic data, so as to integrate the traffic information;

a semantic complementary processing unit which searches the traffic information that semantically complements with each other according to the relation table in the knowledge base, and combines the traffic information that semantically implements with each other, so as to integrate the traffic information; and an outputting unit which outputs the integrated traffic information.

19. The apparatus according to claim 1, wherein the traffic information integrating device comprises:

an input unit which receives the traffic information with unified format;

a spatial conflict processing unit which detects the traffic information of which described spatial location are adjoined but the traffic description are contradict with each other according to a relation table in the knowledge base, which describes relationship between concepts associated with traffic situations, and corrects the contradict traffic information so as to integrate the traffic information;

a spatial complementary processing unit which detects the traffic information of which described spatial location are adjoined but the traffic description are not complete according to the relation table in the knowledge base, and then generates complementary traffic information so as to form the integrated traffic information;

a time conflict processing unit which corrects the traffic information that has time conflict with each other by comparing the traffic status about the same location on different time according to concept information in the knowledge base, so as to integrate the traffic information;

a time complementary processing unit which complements the traffic information that lacks traffic description on a certain time by comparing the traffic information on adjacent time, so as to integrate the traffic information;

a semantic conflict processing unit which searches the traffic information that has semantic conflict with each other based on the relation table in the knowledge base, and selects the traffic information having high reliability from the traffic information that has semantic conflict with each other, according to at least one of the determination conditions including the reliability of an information source, the majority having priority, comparison with the current time and comparison with the history traffic data, so as to integrate the traffic information;

a semantic complementary processing unit which searches the traffic information that semantically complements with each other according to the relation table in the knowledge base, and combines the traffic information that semantically implements with each other, so as to integrate the traffic information; and an outputting unit which outputs the integrated traffic information.

20. A traffic information processing method, comprising:

unifying input traffic information with different formats to traffic information with unified format; and integrating the traffic information with the unified format by a processor, wherein the integrating the traffic information comprises:

receiving a plurality of pieces of the traffic information with the unified format relating to a location, comparing traffic status for the location included in a first piece among the plurality of pieces of traffic information with traffic status included in other pieces of the traffic information relating to the location, determining whether there is a conflict between the first piece of the traffic information and the other pieces of the traffic information, and correcting or complementing the first piece of the traffic information to be consistent with the other pieces of the traffic information.

21. The method according to claim 20, wherein the knowledge base is generated by the following steps:

a concept section extracting step of extracting geographic categories, geographic entities, geographic direction and traffic situation from an electronic map and extracting synonymous word of each concept, as a concept section;

an attribute section extracting step of extracting the data fields associated with the location description from the electronic map as an attribute and obtaining value type corresponding to each attribute, as the attribute section;

a relation section extracting step of extracting the geospatial relationship between the geographic entities and the semantic relationship between concepts, as a relation section; and a combining step of combining the extracted concept section, attribute section, relation section and an axiom part, which are rules based on the concept section and relation section, to further deduce the relation section so as to generate the location knowledge base.

22. The method according to claim 20, further comprising at least one of the following steps:

a synonymous information processing step of transforming the synonymous descriptions in the traffic information with unified format to identical description information, and transmitting the transformed traffic information to the traffic information integrating step;

a checking step of performing on the transformed traffic information at least one of the checking processes: existence checking, completeness checking, semantic error checking, time expiration checking, and redundancy checking, and then transmits the checked traffic information to the traffic information integrating step; and a knowledge base mapping step of mapping the checked traffic information with unified format to the traffic information defined in the knowledge base by using the knowledge base.

23. The method according to claim 22, wherein the knowledge base mapping step comprises at least one of the steps:

a decomposing step of decomposing the traffic information containing combined information into the traffic information of the geographic points defined in the knowledge base according to a relation table in the knowledge base, which describes relationship between concepts associated with traffic situations; and a transforming step of transforming the traffic information containing indirect information to the traffic information of the traffic point defined in the knowledge base according to the relation table in the knowledge base.

24. The method according to claim 23, wherein the knowledge base mapping step further comprises:

a mapping step of mapping the decomposed or transformed traffic information to an electronic map by using the longitude and latitude information defined by attribute information in the knowledge base.

25. The method according to claim 20, wherein the traffic information integrating steps comprises at least one of the following steps:

a spatial conflict processing step of detecting the traffic information of which described spatial location are adjoined but the traffic description are contradict with each other according to a relation table in the knowledge base, which describes relationship between concepts associated with traffic situations, and correcting the contradict traffic information so as to integrate the traffic information;

a spatial complementary processing step of detecting the traffic information of which described spatial location are adjoined but the traffic description are not complete according to the relation table in the knowledge base, and then generating complementary traffic information so as to form the integrated traffic information;

a time conflict processing step of correcting the traffic information that has time conflict with each other by comparing the traffic status about the same location on different time according to concept information in the knowledge base, so as to integrate the traffic information; and;

a time complementary processing step of complementing the traffic information that lacks traffic description on a certain time by comparing the traffic information on adjacent time, so as to integrate the traffic information;

a semantic conflict processing step of searching the traffic information that has semantic conflict with each other based on the relation section in the knowledge base, and selecting the traffic information having high reliability from the traffic information that has semantic conflict with each other, according to at least one of the determination conditions including the reliability of an information source, the majority having priority, comparison with the current time and comparison with the history traffic data, so as to integrate the traffic information;

a semantic complementary processing step of searching the traffic information that semantically complements with each other according to the relation section in the knowledge base, combining the traffic information that semantically implements with each other, so as to integrate the traffic information.

26. A traffic information processing apparatus, comprising:

an inputting device, which receives traffic information with unified format;

a traffic information integrating device which corrects or complements the traffic information with unified format based on knowledge base to obtain traffic information which is consistent with each other, so as to integrate the traffic information, wherein the knowledge base is external to the apparatus or internal to the apparatus; and an outputting unit which outputs the integrated traffic information, wherein the traffic information integrating device receives a plurality of pieces of the traffic information with the unified format relating to a location, compares traffic status for the location included in a first piece among the plurality of pieces of traffic information with traffic status included in other pieces of the traffic information relating to the location, determines whether there is a conflict between the first piece of the traffic information and the other pieces of the traffic information, and corrects or complements the first piece of the traffic information to be consistent with the other pieces of the traffic information.

27. A traffic information processing method, comprising:

receiving traffic information with unified format; and integrating the traffic information with the unified format by a processor, wherein the integrating the traffic information comprises:

receiving a plurality of pieces of the traffic information with the unified format relating to a location, comparing traffic status for the location included in a first piece among the plurality of pieces of traffic information with traffic status included in other pieces of the traffic information relating to the location, determining whether there is a conflict between the first piece of the traffic information and the other pieces of the traffic information, and correcting or complementing the first piece of the traffic information to be consistent with the other pieces of the traffic information.

* * * * *